(12) United States Patent
Fujinami et al.

(10) Patent No.: US 6,321,652 B1
(45) Date of Patent: *Nov. 27, 2001

(54) IMAGE FORMING AND PLATE MAKING METHOD AND APPARATUS

(75) Inventors: Tatsuo Fujinami; Masami Iwayama; Kouichi Sasakura; Yoshio Mitsumori, all of Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/355,828

(22) PCT Filed: Feb. 6, 1998

(86) PCT No.: PCT/JP98/00499

§ 371 Date: Aug. 5, 1999

§ 102(e) Date: Aug. 5, 1999

(87) PCT Pub. No.: WO98/34795

PCT Pub. Date: Aug. 13, 1998

(30) Foreign Application Priority Data

Feb. 6, 1997 (JP) .................................................. 9-024013
Jun. 12, 1997 (JP) .................................................. 9-155164

(51) Int. Cl.[7] .................................................... B41C 1/10

(52) U.S. Cl. ........................... 101/465; 101/467; 101/478

(58) Field of Search ................................ 101/463.1, 465, 101/466, 467, 478

(56) References Cited

U.S. PATENT DOCUMENTS

| | | | |
|---|---|---|---|
| 4,718,340 | * | 1/1988 | Love, III ................................ 101/467 |
| 5,713,287 | * | 2/1998 | Gelbart .................................. 101/467 |
| 5,996,499 | * | 12/1999 | Gelbart et al. ........................ 101/467 |
| 6,146,798 | * | 11/2000 | Bringans et al. ...................... 101/467 |

FOREIGN PATENT DOCUMENTS

| | | |
|---|---|---|
| 62-297186 | 12/1987 | (JP) . |
| 01-255857 | 10/1989 | (JP) . |
| 01-262547 | 10/1989 | (JP) . |
| 05-001006 | 1/1993 | (JP) . |
| 05-155934 | 6/1993 | (JP) . |
| 05-320227 | 12/1993 | (JP) . |
| PCT/JP91/01352 | 4/1992 | (WO) . |

OTHER PUBLICATIONS

"Adsorption/Desorption Process of Alkanethiol Self Assembled Monolayer on Au(111)", Nishida et al., Technical Report of IEICE 7–96 (w/English Abstract).

(List continued on next page.)

*Primary Examiner*—Stephen R. Funk
(74) *Attorney, Agent, or Firm*—Morgan, Lewis & Bockius LLP

(57) ABSTRACT

An image forming apparatus comprises: an image forming body comprising a substrate and a self-assembling compound adsorbed to a surface of the substrate to form a self-assembling monomolecular film; a first desorbing device for selectively desorbing at least a part of the self-assembling compound forming the self-assembling monomolecular film from the surface of the image forming body, so as to provide the surface of the image forming body with a desorbed face and an undesorbed face which have wettabilities different from each other; a developing device for supplying the surface of the image forming body with ink which preferentially attaches to one of the desorbed face or undesorbed face; and a transfer device for transferring to a recording medium the ink attached to the surface of the image forming body. In this apparatus, a printing plate can easily be formed and erased, and the same printing plate can be used repeatedly. Therefore, higher-speed printing, smaller dimensions in the apparatus, lower running cost at the time of copy-printing a small number of sheets can be realized, while making it possible to achieve higher resolution.

27 Claims, 14 Drawing Sheets

OTHER PUBLICATIONS

"Research Tendencies on Molecular Cooperative Materials, National Institute of Materials and Chemical Research Report", vol. 4, No. 2 (1996) (w/English translation of highlighted portions).

Adhesion and Adhesives, Minoru Inoue, vol. 34, No. 7 (1990), 289–292 (discussed at p. 19 of specification).

"Formation of Monolayer Films by Spontaneous Assembly of Organic Thiols from Solution onto Gold", Colin D. Bain et al., J. Am. Chem. Soc., 111 (1989), 321–335 (discussed at p. 18 of specification).

"Photopatterning of Self–Assembled Alkanethiolate Monolayers on Gold: A Simple Monolayer Photoresist Utilizing Aqueous Chemistry", Jingyu Huang et al., Langmuir, 10 American Chemical Society (1994), 626–628 (discussed at p. 37 of specification).

"Adsorption of Bifunctional Organic Disulfides on Gold Surfaces", Ralph G. Nuzzo et al., J. Am. Chem. Soc., 105 (1983), 4481–4483 (discussed at p. 13 of specification).

"Spontaneously Organized Molecular Assemblies. 4. Structural Characterization of $n$–Alkyl Thiol Monolayers on Gold by Optical Ellipsometry Infrared Spectroscopy, and Electrochemistry", Mare D. Porter et al., J. Am. Chem. Soc., 109 (1987) 3559–3568 (discussed at p. 19 of specification).

"Spontaneously Organized Molecular Assemblies. 3. Preparation and Properties of Solution Adsorbed Monolayers of Organic Disulfides on Gold Surfaces", Ralph G. Nuzzo et al., J. Am. Chem. Soc., 109 (1987), 2358–2368 (discussed at p. 19 of specification).

Masahiko Hara et al., Journal of Applied Physics, Japan, vol. 64, No. 12 (1995), 1234–1238 (discussed at p. 30 of specification).

* cited by examiner

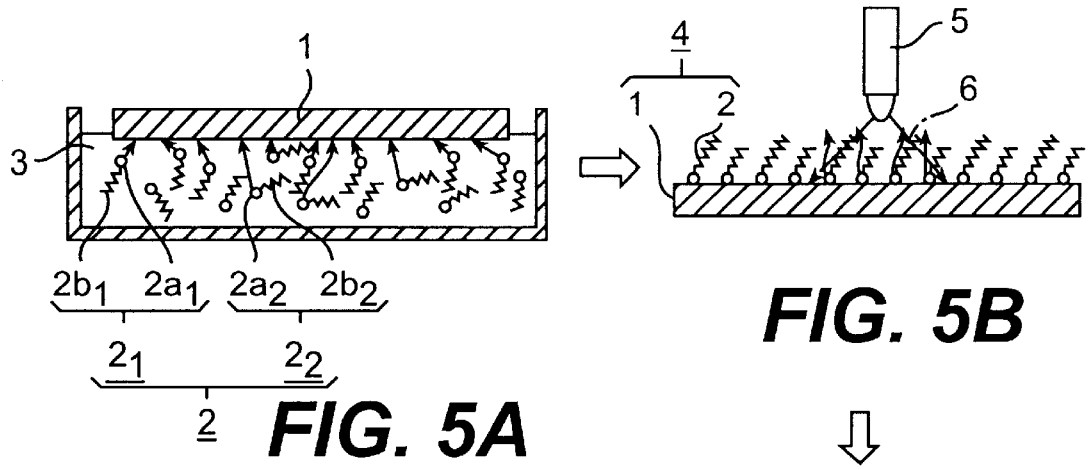
FIG. 5A
FIG. 5B
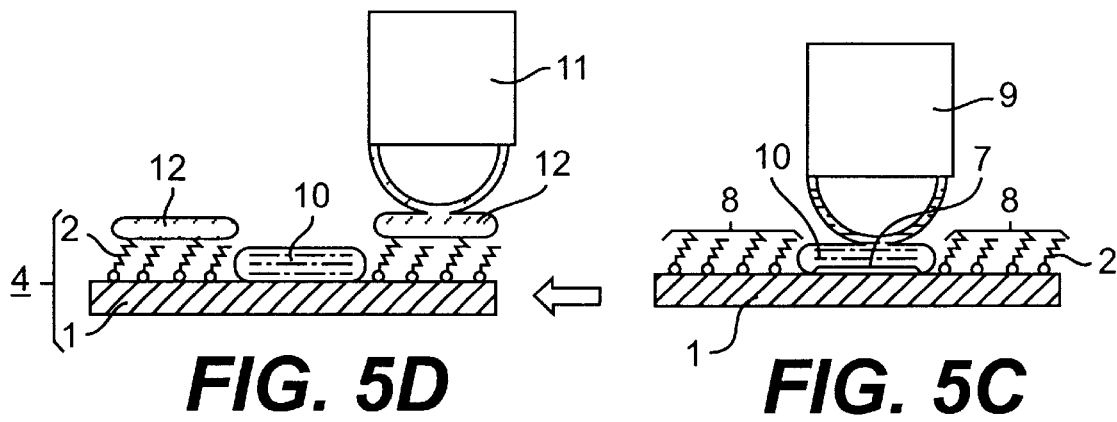
FIG. 5D
FIG. 5C
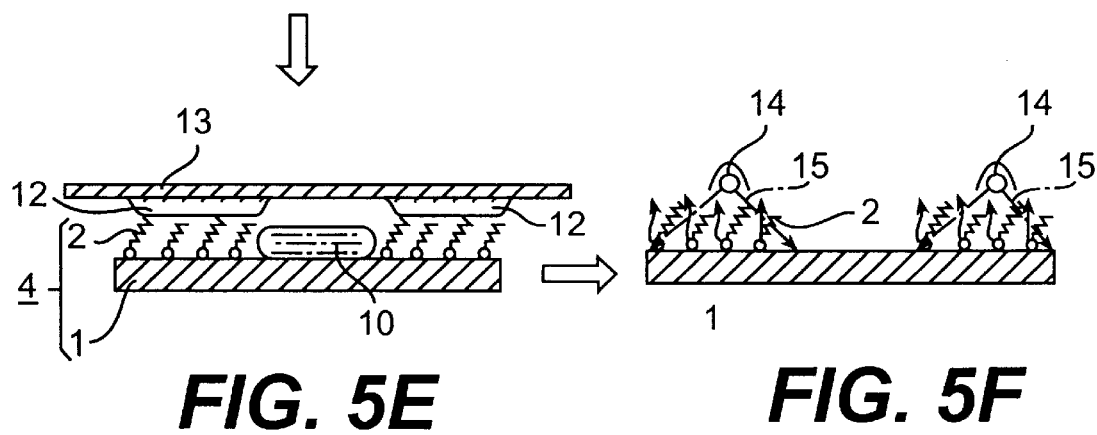
FIG. 5E
FIG. 5F

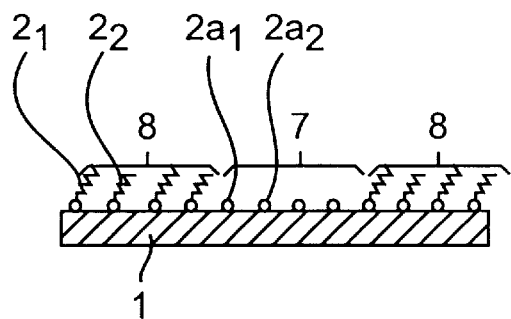
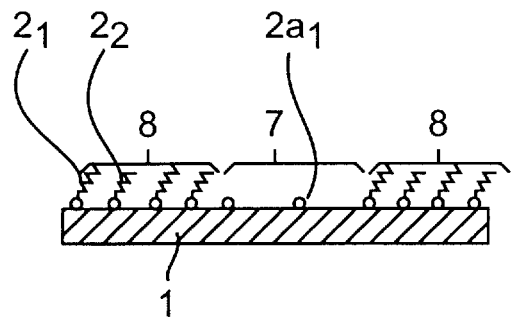
FIG. 6A  FIG. 6B
FIG. 7
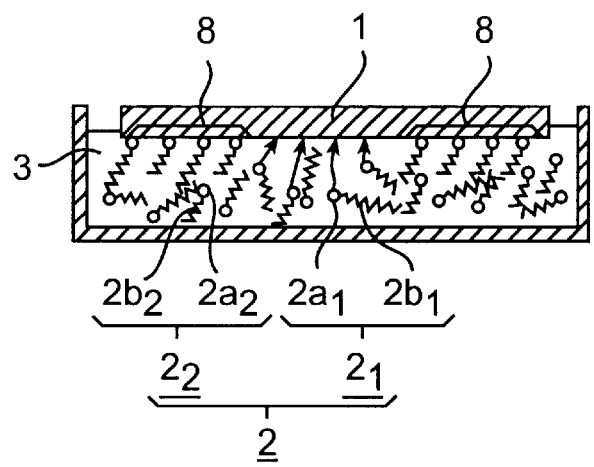
FIG. 8
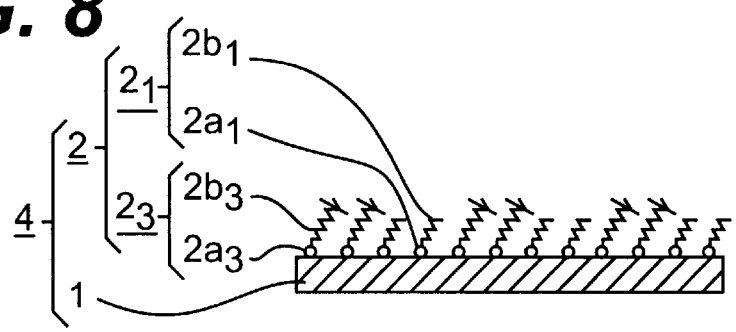

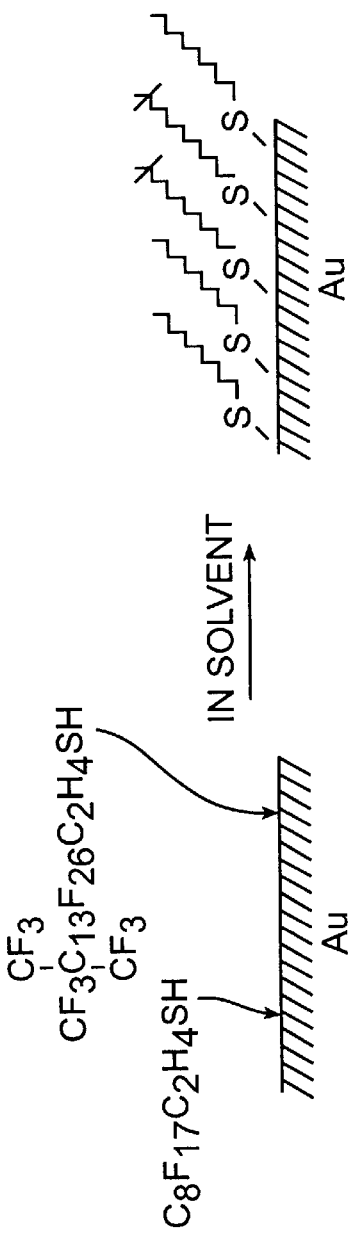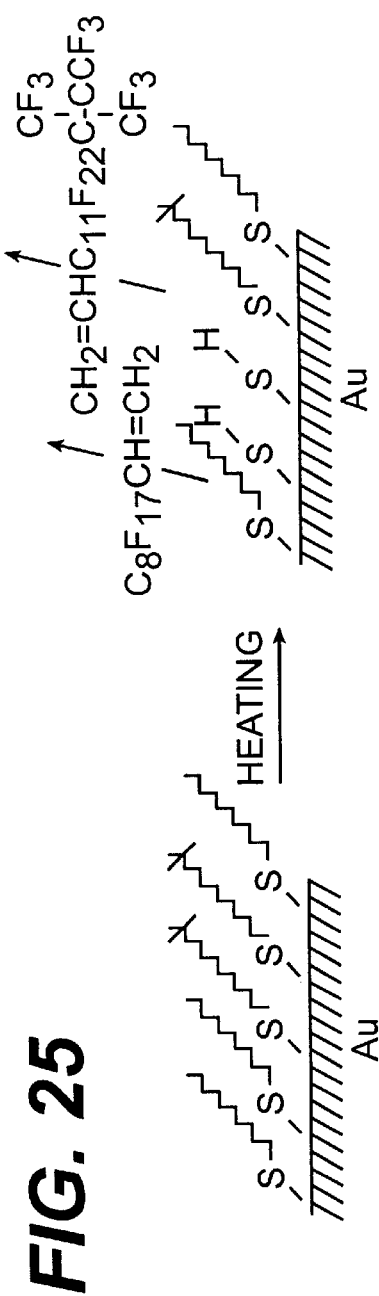
FIG. 24
FIG. 25

IMAGE FORMING AND PLATE MAKING METHOD AND APPARATUS

TECHNICAL FIELD

The present invention relates to an image forming apparatus, an image forming method, and a platemaking method. More specifically, the present invention relates to an image forming apparatus, an image forming method, and a platemaking method, which are characterized in their image forming body used as a printing plate.

BACKGROUND ART

Known as conventional printers are electrophotographic printers, mimeograph printers, and the like.

In the electrophotographic printer, the whole surface of a clean drum is electrically charged by corona discharge, and the electrically charged drum surface is selectively exposed to light. The exposed surface is discharged, whereby a latent image can be formed on the drum surface by a charged area and an uncharged area. After the latent image is formed, toner is attached to the drum surface by a developing section, so as to form a visual image. Thus formed visual image is transferred onto a recording medium in a transfer section, and then is fixated to the recording medium by a fixating section.

Since the electrophotographic printer necessitates a process of forming a latent image per sheet at the time of printing a plurality of sheets, however, there is a limit to increasing the printing speed.

In the mimeograph printer, which is known as a light-duty printer for business use, on the other hand, a thermal head selectively forms holes in a stencil, so as to form a printing plate. Thus formed plate is wound about a drum, and then ink is supplied to the plate from the inside of the drum, whereby an ink image is formed by the ink passed through the above-mentioned holes. Thereafter, the ink image is transferred to a recording medium in a transfer section.

The mimeograph printer, however, has the following drawbacks. Namely, the plate wound about the drum has to be discarded after the printing is over. As a consequence, it is necessary to provide a mechanism for removing the plate to be discarded from the drum, a space for storing thus removed plate carrying ink, and a complicated mechanism for taking the plate out of the apparatus. Since ink attaches to the plate to be discarded, the amount of use of ink unnecessarily increases, thereby raising the cost of prints. Further, since no new image can be formed on a mimeograph stencil which has once been prepared, a new mimeograph stencil is necessary for forming a new plate. Thus, it is disadvantageous in that, while the running cost per sheet at the time of copy-printing a large number of sheets becomes lower, the running cost per sheet at the time of copy-printing a small number of sheets becomes higher. Also, since processes of discarding the used stencil, forming a new plate, winding the plate about a drum, and so forth are necessary for printing a new image, it is disadvantageous in that the apparatus complicates its structure and enhances its dimensions.

DISCLOSURE OF THE INVENTION

In view of the above-mentioned problems inherent in the prior art, it is an object of the present invention to provide a novel image forming apparatus and image forming method in which a printing plate can easily be formed and erased, and the same printing plate can be used repeatedly, thereby making it possible to reduce the dimensions of the apparatus, lower the running cost at the time of copy-printing a small number of sheets, and realize a higher resolution; and a method of making such a printing plate for image formation.

As a result of diligent studies for achieving the above-mentioned object, the inventors have found that the object can be attained when a printing plate is formed by using, as an image forming body, a substrate covered with a film (i.e., self-assembling monomolecular film) formed by a material (i.e., self-assembling compound) which is detachably adsorbed to the surface of the substrate and is substantially regularly arranged due to intermolecular mutual actions, and then selectively desorbing at least a part of the self-assembling compound forming the self-assembling monomolecular film; thereby accomplishing the present invention.

Namely, the image forming apparatus in accordance with the present invention comprises:

an image forming body comprising a substrate and a self-assembling compound adsorbed to a surface of the substrate to form a self-assembling monomolecular film;

a first desorbing device for selectively desorbing at least a part of the self-assembling compound forming the self-assembling monomolecular film from the surface of the image forming body, so as to provide the surface of the image forming body with a desorbed face and an undesorbed face which have wettabilities different from each other;

a developing device for supplying the surface of the image forming body with ink which preferentially attaches to one of the desorbed face or undesorbed face; and a transfer device for transferring to a recording medium the ink attached to the surface of the image forming body.

The image forming apparatus in accordance with the present invention may further comprise a first film forming device which supplies the surface of the substrate with the self-assembling compound and forms the self-assembling monomolecular film on the surface of the substrate.

The image forming apparatus in accordance with the present invention may further comprise a second film forming device which supplies the surface of the image forming body with the self-assembling compound and forms the self-assembling monomolecular film on the desorbed face again. In this case, it is preferred that the image forming apparatus further comprise a second desorbing device which desorbs the self-assembling compound forming the undesorbed surface from the surface of the image forming body, so as to cause the whole surface of the image forming body to become the desorbed face.

The image forming apparatus in accordance with the present invention may further comprise a moisture supply device which supplies, before the ink is supplied, moisture which preferentially attaches to one of the desorbed face or undesorbed face, to the surface of the image forming body.

Preferable as the desorbing device in the image forming apparatus in accordance with the present invention is a heating device which applies thermal energy to the self-assembling compound forming the self-assembling monomolecular film, so as to desorb the compound.

The image forming method in accordance with the present invention is a method including:

a first desorbing step of selectively desorbing, from a surface of an image forming body comprising a substrate and a self-assembling compound adsorbed to a surface of the substrate to form a self-assembling film, at least a part of the self-assembling compound forming the self-assembling monomolecular film, so as to provide the surface of the image forming body with a desorbed face and an undesorbed face which have wettabilities different from each other;

a developing step of supplying the surface of the image forming body with ink which preferentially attaches to one of the desorbed face or undesorbed face; and a transfer step of transferring to a recording medium the ink attached to the surface of the image forming body.

The image forming method in accordance with the present invention may further comprise a first film forming step of supplying the surface of the substrate with the self-assembling compound and forming the self-assembling monomolecular film on the surface of the substrate.

The image forming method in accordance with the present invention may further comprise a second film forming step of supplying the surface of the image forming body with the self-assembling compound and forming the self-assembling monomolecular film on the desorbed face again. In this case, it is preferred that the image forming method further comprise a second desorbing step of desorbing the self-assembling compound forming the undesorbed surface from the surface of the image forming body, so as to cause the whole surface of the image forming body to become the desorbed face.

The image forming method in accordance with the present invention may further comprise a moisture supply step of supplying, before the ink is supplied, moisture which preferentially attaches to one of the desorbed face or undesorbed face, to the surface of the image forming body.

Preferable as the desorbing step in the image forming method in accordance with the present invention is a heating step of applying thermal energy to the self-assembling compound forming the self-assembling monomolecular film, so as to desorb the compound.

The platemaking method in accordance with the present invention is a method including:

a desorbing step of selectively desorbing, from a surface of an image forming body comprising a substrate and a self-assembling compound adsorbed to a surface of the substrate to form a self-assembling film, at least a part of the self-assembling compound forming the self-assembling monomolecular film, so as to provide the surface of the image forming body with a desorbed face and an undesorbed face which have wettabilities different from each other, thereby yielding a printing plate.

The platemaking method in accordance with the present invention may further comprise a film forming step of supplying the surface of the substrate with the self-assembling compound and forming the self-assembling monomolecular film on the surface of the substrate.

Preferable as th e desorbing step in the platemaking method in accordance with the present invention is a heating step of applying thermal energy to the self-assembling compound forming the self-assembling monomolecular film, so as to desorb the compound.

The above-mentioned self-assembling compound in the present invention is, as will be described later in detail, a compound which can spontaneously form a substantially uniform adsorption film of a monomolecular layer (self-assembling monomolecular film) on a predetermined substrate surface (solid-liquid interface). A preferable example thereof is one having an adsorptive functional group which can be adsorbed to the surface of the substrate and an aliphatic compound residue combined to the adsorptive functional group.

Also, at least two kinds of self-assembling compounds may be used in the present invention, whereby an adsorption film of a monomolecular layer having a minute uneven structure is spontaneously formed on the surface of the substrate. As such at least two kinds of self-assembling compounds, preferable are those having their respective aliphatic compound residues with main chain lengths different from each other and wettabilities identical to each other, and those having their respective aliphatic compound residues with steric configurations different from each other and wettabilities identical to each other.

BRIEF DESCRIPTION OF THE DRAWINGS

FIGS. 5A to 5F are schematic views in section showing states of the substrate surface in various steps of another preferred embodiment of the image forming method in accordance with the present invention, respectively;

FIGS. 6A and 6B are schematic views in section showing other examples of the state of the desorbed face formed in the image forming body in accordance with the present invention, respectively;

FIG. 7 is a schematic view in section showing another example of the state in which a self-assembling monomolecular film is re-formed in the image forming body in accordance with the present invention;

FIG. 8 is a schematic view in section showing another example of the state in which a self-assembling monomolecular film has been formed in the image forming body in accordance with the present invention;

FIG. 24 is a schematic view in section showing still another example of the state in which the self-assembling compound in accordance with the present invention is adsorbed to the substrate surface; and FIG. 25 is a schematic view in section showing still another example of the state in which the self-assembling compound in accordance with the present invention is selectively desorbed from the substrate surface.

BEST MODES FOR CARRYING OUT THE INVENTION

Figure 1:
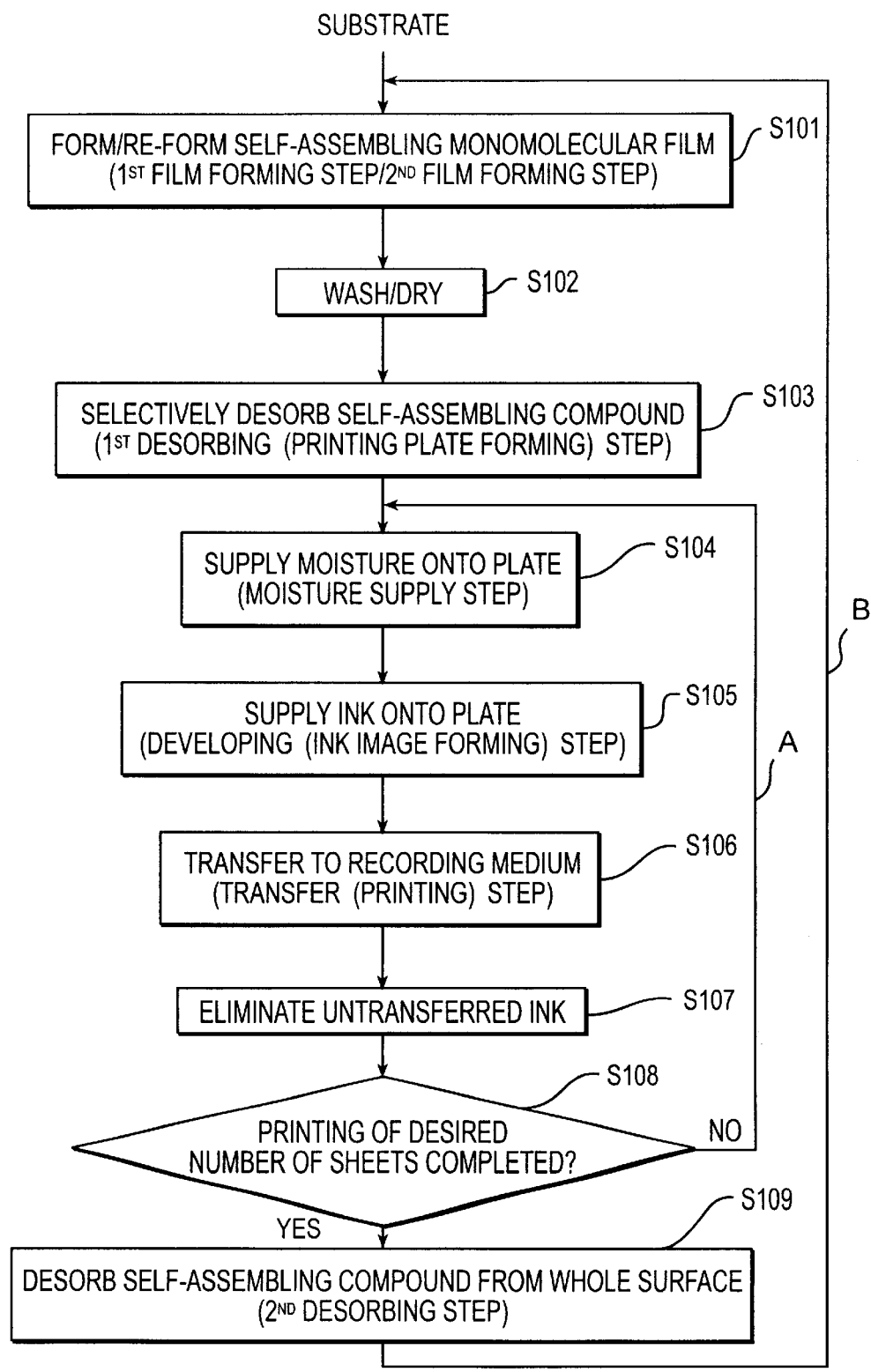
FIG. 1 is a flowchart showing a preferred embodiment of the image forming method and platemaking method in accordance with the present invention.

In the following, preferred embodiments of the present invention will be explained in detail with reference to the drawings. Among the drawings, parts identical or equivalent to each other will be referred to with numerals or letters identical to each other.

First, the self-assembling monomolecular film in accordance with the present invention will be explained.

When adsorbed (chemically adsorbed) to a specific substrate surface, a so-called self-assembling compound is arranged substantially regularly on the substrate surface due to the molecular assembling property of the former (the adsorption action due to the adsorptive functional group and the intermolecular mutual actions caused by the groups combined to the adsorptive functional group). Films formed by such an arrangement are referred to as self-assembling monomolecular films or self-assembled monolayers (abbreviated as SAM). Also, thus regularly arranging the self-assembling compound on the substrate surface is referred to as modifying the substrate surface with the self-assembling compound. A phenomenon such as that mentioned above is reported in R. G. Nuzzo et al., J. Am. Chem. Soc., 105 (1983), 4481–4483 (*0), and the like, from which the above-mentioned phenomenon has been known to occur between specific materials (a substrate and a self-assembling compound).

Though not restricted in particular, examples of the substrate in accordance with the present invention include metals such as gold, platinum, silver, copper, aluminum, and the like; oxides such as aluminum oxide, silicon oxide, and the like; resins such as polyethylene and the like; selenides such as zinc selenide and the like; and a single-crystal silicon. Among these, the metals such as gold, platinum and the like, and the oxides such as aluminum oxide, silicon oxide and the like are preferable; and gold and platinum are particularly preferable.

Though not restricted in particular, examples of the self-assembling compound in accordance with the present invention include the following. Here, *1 to *8 in the following explanation indicate the references disclosing their corresponding self-assembling compounds.

(I) A thiol compound expressed by general formula (1): $HSR^1$, which is represented by:
i) adsorptive functional group: SH group (thiol group);
ii) substrate: gold, silver, or the like; and
iii) $R^1$: aliphatic compound residue, which is more specifically selected from the following:
   a) alkyl residue (e.g., $-(CH_2)_mCH_3$ where m=1 to 21, *1, 2, 3, 4, 5, 6);
   b) halogen (F, Br, Cl)-substituted alkyl residue (e.g., $-(CH_2)_2(CF_2)_nCF_3$ where n=5 to 15, $-(CH_2)_oCF_3$ where o=5 to 15, $-(CH_2)_{11}Br$, $-(CH_2)_{11}C$, *1, 2);
   c) alkenyl residue (e.g., $-(CH_2)_{17}CH=CH_2$, *1);
   d) alcohol residue (e.g., $-(CH_2)_pOH$ where p=2 to 22, *1, 2, 4, 6);
   e) aliphatic carboxylic acid residue (e.g., $-(CH_2)_qCOOH$ where q=1 to 15, *1, 2, 6);
   f) aliphatic carboxylic acid ester residue (e.g., $-(CH_2)_rCOOCH_3$ where r=10 to 15, *1, 6);
   g) aliphatic ether residue (e.g., $-(CH_2)_{11}OCH_3$, *1 );
   h) aliphatic thiol ester residue (e.g., $-(CH_2)_{12}SCOCH_3$, *1);
   i) alkyl cyanide residue (e.g., $-(CH_2)_8CN$, *1);
   j) siloxylated alkyl residue (e.g., $-(CH_2)_{11}OSi(CH_3)_2(C(CH_3)_3)$, *1); and
   k) carbamoyl alkyl residue (e.g., $-(CH_2)_{15}CONH_2$, *6).

(II) A disulfide compound expressed by general formula (2): $R^2SSR^3$, which is represented by:
i) adsorptive functional group: SS group (disulfide group);
ii) substrate: gold or the like;
iii) $R^2$ and $R^3$ being either identical or different from each other, each being an aliphatic compound residue, which is more specifically selected from the following:
   a) alkyl residue (e.g., $-(CH_2)_sCH_3$ where s=0 to 17, *7);
   b) halogen (F, Br, Cl)-substituted alkyl residue;
   C) alkenyl residue (e.g., $-(CH_2)_{20}CH=CH_2$, *7);
   d) alcohol residue (e.g., $-(CH_2)_yOH$ where y=2 to 22);
   e) aliphatic carboxylic acid residue (e.g., $-(CH_2)_tCOOH$ where t=2 to 10, *7);
   f) aliphatic amine residue (e.g., $-(CH_2)_2NH_2$, *7); and
   g) $R^2$ and $R^3$ forming a group expressed by the following general expression:

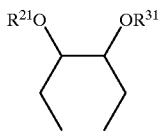

[where $R^{21}$ and $R^{31}$ may be either identical or different from each other, each indicating H—, $CF_3(CF_2)_uCO$— where u=0 to 6, $CF_3(CF_2)_vCO$— where v=0 to 14, or (p—$NO_2$) $C_6H_4CO$—] (*7).

(III) A sulfide compound expressed by general formula (3): $R^4SR^5$, which is represented by:
i) adsorptive functional group: S group (sulfide group);
ii) substrate: gold or the like;
iii) $R^4$ and $R^5$ being either identical or different from each other, each being an aliphatic compound residue, which is more specifically selected from the following:
  a) alkyl residue (e.g., —$(CH_2)_{17}CH_3$, *1); and
  b) halogen (F, Br, Cl)-substituted alkyl residue.

(IV) A carboxylic acid compound expressed by general formula (4): $HOOCR^6$, which is represented by:
i) adsorptive functional group: COOH group (carboxylic group);
ii) substrate: platinum, aluminum, zinc selenide, polyethylene, or the like;
iii) $R^6$ being an aliphatic compound residue, which is more specifically selected from the following:
  a) alkyl residue (e.g., —$C_wH_{2w+1}$ where w=4 to 19, cyclopentyl group, *1, 6); and
  b) halogen (F, Br, Cl)-substituted alkyl residue (e.g., —$(CF_2)_{10}CF_3$, *1).

(V) An amine compound expressed by general formula (5): $H_2NR^7$, which is represented by:
i) adsorptive functional group: $NH_2$ group (amino group);
ii) substrate: platinum, polyethylene, or the like;
iii) $R^7$ being an aliphatic compound residue, which is more specifically selected from the following:
  a) alkyl residue (e.g., —$(CH_2)_{17}CH_3$, *1); and
  b) halogen (F, Br, Cl)-substituted alkyl residue.

(VI) A diazo compound expressed by general formula (6): $N_2R^8$, which is represented by:
i) adsorptive functional group: $N_2$ group (diazo group);
ii) substrate: aluminum oxide, silicon oxide, or the like;
iii) $R^8$ being an aliphatic compound residue, which is more specifically selected from the following:
  a) aliphatic ketone residue (e.g., —$CHCO(CH_2)_xCH_3$ where x=14 to 16, *8).

(VII) An azide compound expressed by general formula (7): $N_3R^9$, which is represented by:
i) adsorptive functional group: $N_3$ group (azide group);
ii) substrate: aluminum oxide, silicon oxide, or the like;
iii) $R^9$ being an aliphatic compound residue, which is more specifically selected from the following:
  a) aliphatic carboxylic acid residue (e.g., —$OCO(CH_2)_{15}CH_3$, *8); and
  b) aliphatic aldehyde residue (e.g., —$CO(CH_2)_{16}CH_3$, *8).

(VIII) Others

A silicon compound (e.g., $CH_3(CH_2)_{17}SiCl_3$, *1), which is represented by:
i) adsorptive functional group: Si (silicon); and
ii) substrate: silicon.

An aldehyde (e.g., $HCONH(CH_2)_4CH_3$, $HCONHCH(CH_2CH_3)_2$, $HCONHC_5H_9$, $HCONHC(CH_3)_3$, *6), which is represented by:

i) adsorptive functional group: CO (carbonyl group); and
ii) substrate: polyethylene.
(References)
1: C. D. Bain et al., J. Am. Chem. Soc., 111 (1989), 321–335.
2: M. D. Porter et al., J. Am. Chem. Soc., 114 (1992), 5860–5862.
3: M. D. Porter et al., J. Am. Chem. Soc., 109 (1987), 3559–3568.
4: G. H. Whitesides et al., Langmuir, 8 (1992), 1330–1341.
5: M. D. Porter et al., J. Electro. Chem., 310 (1990), 335–359.
6: Minoru Inoue, Adhesion and Adhesives, Vol. 34, No. 7 (1990), 289–292.
7: R. G. Nuzzo et al., J. Am. Chem. Soc., 109 (1987), 2358–2368.
8: D. A. Holden et al., Tetrahedron, 43 (1987), 1671–1678.

Here, without being restricted to those mentioned above, the self-assembling compound in accordance with the present invention may be any compound as long as it can form a self-assembling monomolecular film on a predetermined substrate surface. Since sulfur exhibits a specific affinity for gold, however, the above-mentioned thiol compound, disulfide compound, and sulfide compound including sulfur as an absorptive functional group are preferable when gold is used as a substrate.

Also, without being restricted to those mentioned above, the aliphatic compound residue constituting the self-assembling compound in accordance with the present invention is selected depending on the combination of the substrate and adsorptive functional group employed and the like. When an alkyl residue or a halogen-substituted aliphatic compound residue (e.g., halogen-substituted alkyl residue) or an alcohol residue is used as the aliphatic compound residue, the one having a carbon number within the range of 1 to 22 is preferable, and the one having a carbon number within the range of 5 to 15 is particularly preferable. It is due to the fact that the thermal stability of the bonding between the substrate and self-assembling compound tends to become too high when the carbon number is too large, whereas there tends to occur a possibility that the self-assembling compound adsorbed to the substrate fails to attain a sufficient uniformity when the carbon number is too small.

The self-assembling monomolecular film formed by the above-mentioned self-assembling compound yields a surface in which the terminal of aliphatic compound residue (which is the end on the side not combined to the adsorptive functional group) is substantially uniformly arranged, whereby the wettability of the monomolecular surface is not influenced by the substrate surface. As a consequence, controlling the terminal functional group on the self-assembling monomolecular film surface (the terminal functional group of the aliphatic compound residue) enables the surface to have various characteristics. Namely, using a water-repellent, oil-repellent, or water- and oil-repellent functional group as its terminal functional group together with a substrate having a surface with a wettability (e.g., hydrophilic and lipophilic properties) different from that of the terminal functional group can control the wettability of the image forming body surface constituted thereby, so as to be utilized in the image forming apparatus.

For example, when a self-assembling compound having at a terminal an alkyl residue in which only hydrogen atoms are combined to its carbon main chain is self-assembled to a hydrophilic and lipophilic substrate surface, then the surface of the monomolecular film exhibits water-repellent and lipophilic properties. As a consequence, the area modified with the self-assembling compound becomes water-repellent, whereas the unmodified area becomes hydrophilic. On the other hand, when a self-assembling compound having at a terminal an alkyl residue whose hydrogen atoms have partly or completely been substituted by a halogen (fluorine or the like) is self-assembled to a hydrophilic and lipophilic substrate surface, then the surface of the monomolecular film exhibits water- and oil-repellent properties. As a consequence, the area modified with the self-assembling compound becomes water- and oil-repellent, whereas the unmodified area becomes hydrophilic and lipophilic.

Also, in the present invention, a mixture of at least two kinds of materials may be used as the above-mentioned self-assembling compound. As they are adsorbed to the substrate surface while mingling with each other, a self-assembling monomolecular film having a minute (micro) uneven structure is formed on the surface.

As a minute uneven structure is formed on the surface of the self-assembling monomolecular film, its surface area increases, thereby emphasizing the direction of wettability of the surface. Namely, the water- or oil-repellent property in the surface having a minute uneven structure becomes greater than that in a flat surface when the surface of the self-assembling monomolecular film is water- or oil-repellent, whereas the hydrophilic or lipophilic property in the surface having a minute uneven structure becomes greater than that in the flat surface when the surface of the self-assembling monomolecular film is hydrophilic or lipophilic. As a consequence, in a surface covered with a self-assembling monomolecular film having a minute uneven structure formed thereon, the oil-repellent property with respect to oil ink or the water-repellent property with respect to water ink or moisture becomes greater, thereby sufficiently preventing minute droplets from remaining. Here, though the dimensions of the minute uneven structure are not restricted in particular, H/L is preferably 0.1 or greater, where L is the diameter of a depression (diameter of a protrusion) and H is the depth of the depression (height of the protrusion). It is due to the fact that the direction of wettability is less likely to be emphasized if the ratio in the minute uneven structure is less than the above-mentioned value.

At least two kinds of self-assembling compounds which can be used in the present invention are not restricted in particular in terms of their combination as long as they can form a self-assembling monomolecular film having the above-mentioned minute uneven structure. Examples of preferable combinations include (i) a combination of at least two kinds of self-assembling compounds having respective adsorptive functional groups which can be adsorbed to the surface of the substrate, and respective aliphatic compound residues with main chain lengths different from each other and wettabilities identical to each other; and/or (ii) a combination of at least two kinds of self-assembling compounds having respective adsorptive functional groups which can be adsorbed to the surface of the substrate, and respective aliphatic compound residues with steric configurations different from each other and wettabilities identical to each other.

In the case of the combination (i), the difference in the number of carbon atoms constituting the respective main chains of the different kinds of aliphatic compound residues is preferably about 3 to 10. The minute uneven structure is less likely to be formed when the above-mentioned carbon number difference is not greater than 2; whereas longer chains tend to fall upon shorter chains when the above-mentioned carbon number difference is 11 or greater, thereby making it less likely to form minute unevenness.

In the case of the combination (ii), on the other hand, it will be preferable if the combination of aliphatic compound residues having steric configurations different from each other comprises an aliphatic compound residue of a straight chain structure and an aliphatic compound residue of a structure having a side chain (e.g., an alkyl group or halogen-substituted alkyl group having a carbon number of 1 to 3), since a minute (molecular-level) uneven structure tends to be formed reliably thereby. Preferably, the above-mentioned side chain exists in the vicinity of the terminal of the aliphatic compound residue (on the side not combined to the adsorptive functional group).

Further, it is not necessary for at least two kinds of self-assembling compounds (aliphatic compound residues) in accordance with the present invention to have wettabilities completely identical to each other. It will be sufficient if at least one of water- or oil-repellent property is common.

In the self-assembling monomolecular film having a minute uneven structure formed by the above-mentioned at least two kinds of self-assembling compounds, minute droplets are sufficiently prevented from remaining in the surface as mentioned above. Consequently, when this film is utilized in the image forming apparatus, there occurs a tendency to sufficiently prevent prints from getting soiled due to the remaining ink, and whitening from occurring in the prints and the printing density from becoming unstable due to the remaining moisture. Namely, in the case where the desorbed face and the surface modified with the self-assembling compound are used as an image area and a non-image area, respectively, ink is sufficiently prevented from adhering to the non-image area, whereby prints with less soil can be obtained. When the surface modified with the self-assembling compound and the desorbed face are used as the image area and the non-image area (the desorbed face being provided with a dampening solution), then moisture is sufficiently prevented from diffusing into the image area, whereby prints having less whitening, fading, and the like caused by the remaining moisture can be obtained.

With reference to FIGS. 1 and 2A to 2F, preferred embodiments of the image forming method and platemaking method in accordance with the present invention will now be explained in detail. FIG. 1 is a flowchart showing a preferred embodiment of the image forming method in accordance with the present invention (steps S101 to S103 corresponding to a preferred embodiment of the platemaking method in accordance with the present invention), whereas FIGS. 2A to 2F are schematic views in section showing respective states of a substrate surface at various steps in a preferred embodiment of the image forming method in accordance with the present invention (FIGS. 2A and 2B corresponding to respective states of the substrate surface at various steps in a preferred embodiment of the platemaking method in accordance with the present invention).

Figure 2A:
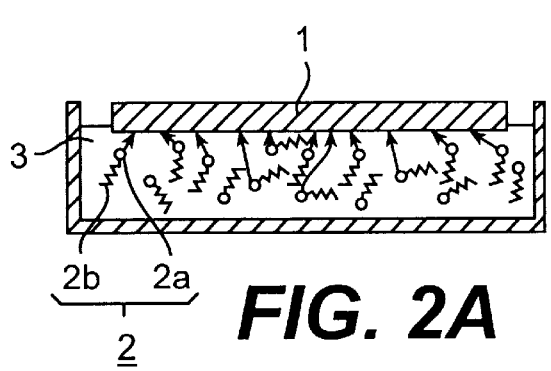
FIGS. 2A to 2F are schematic views in section showing states of a substrate surface at various steps in a preferred embodiment of the image forming method in accordance with the present invention, respectively.
Figure 2B:
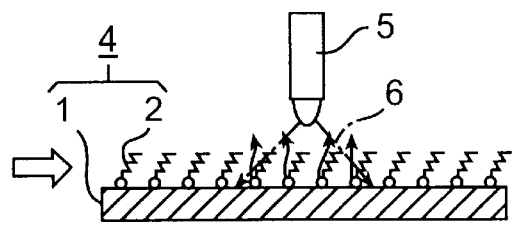

First, in this embodiment, a surface of a substrate 1 is immersed in a solution 3 of a self-assembling compound 2, so as to supply the self-assembling compound 2 to the surface of the substrate 1. Consequently, as shown in FIG. 2A, the self-assembling compound 2 is substantially uniformly arranged and adsorbed to the surface (solid-liquid interface) of the substrate 1 in a spontaneous manner, so as to form an adsorption film of a monomolecular layer (self-assembling monomolecular film), thereby yielding an image forming body 4 (first film forming step S101). The self-assembling compound 2 is constituted by an adsorptive functional group 2a and an aliphatic compound residue 2b combined to the adsorptive functional group 2a. As shown in FIG. 2B, the adsorptive functional group 2a is adsorbed to the surface of the substrate 1, whereas the terminal of the aliphatic compound residue 2b is exposed to the surface of the self-assembling monomolecular film (the face on the exposed side).

The factors influencing the forming speed of such a self-assembling monomolecular film include temperature, the kind of solvent, the concentration of solution, and the like. They are appropriately selected, according to the combination of the self-assembling compound and substrate used, so as to increase the forming speed. Here, the monomolecular film can be formed at room temperature as well. Though the solvent is not restricted in particular, its intrusiveness into the monomolecular layer is preferably low, and organic solvents are preferred from the viewpoint of the solubility of the self-assembling compound. Among these, ethanol (protonic polar solvent), ethyl acetate (nonprotonic polar solvent), hexane (nonpolar solvent), and the like are preferably used. For reliably obtaining a monomolecular film, the concentration of solution is preferably 0.0001 mM or higher, particularly preferably at least 0.01 mM but not higher than 10 mM. It is due to the fact that it tends to take a longer time for forming a monomolecular film if the concentration of solution is too low, whereas there is a tendency of the self-assembling compound itself inhibiting the self-assembling or the excess self-assembling compound being deposited on the surface if the concentration of solution is too high. Here, it is not always necessary for the self-assembling monomolecular film to be formed onto the substrate surface to such an extent that the monomolecular film is completely formed (the compound density attains a saturated state). It will be sufficient if the self-assembling compound is substantially uniformly adsorbed to the substrate surface so that the wettability of the monomolecular film surface differs from the wettability of the substrate surface. Hence, even in the case where it takes several minutes to several hours for obtaining a complete monomolecular film, an image forming body in which different wettabilities are caused by a substantially uniform monomolecular film can be obtained in several seconds (see *1).

Subsequently, the self-assembling monomolecular film formed in the image forming body 4 is washed with a solvent, so as to eliminate the part of self-assembling compound not involved in film formation, and then is dried so as to eliminate the solvent (washing/drying step S102). Such a washing step is not always necessary, and the drying step may be carried out alone.

Then, as shown in FIG. 2B, thermal energy 6 is selectively applied from a first thermal head 5 to the self-assembling compound 2 forming the self-assembling monomolecular film, so as to selectively desorb the self-assembling compound 2 from the surface of the image forming body 4. Consequently obtained is the image forming body 4 (i.e., a printing plate for image formation (transfer)) whose surface is formed with a desorbed face 7 and an undesorbed face 8 which have wettabilities different from each other (first desorbing step S103).

The temperature and time used for desorbing such a self-assembling monomolecular film are appropriately selected according to the combination between the self-assembling compound and substrate (thermal stability of the monomolecular film) used, and the temperature is preferably within the range of 100 to 300° C. After the first desorbing step S103, a step of eliminating the desorbed self-assembling compound 2 by washing the surface of the image forming body 4 and then eliminating the washing liquid by drying (not depicted) may further be provided.

Figure 3A:
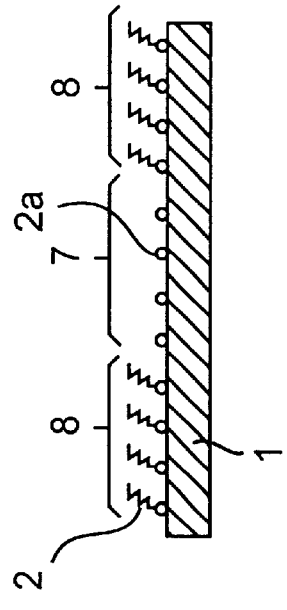
FIGS. 3A and 3B are schematic views in section each showing an example of the state of a desorbed face formed in the image forming body in accordance with the present invention.
Figure 3B:
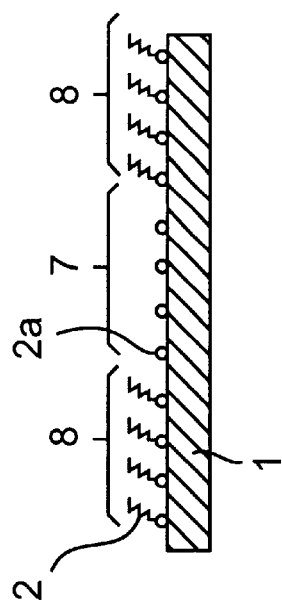

In the desorption of the self-assembling compound 2, the self-assembling compound 2 to be desorbed is not needed to be desorbed completely from the substrate 1. It will be sufficient if, as shown in FIG. 3A, at least the aliphatic compound residue 2b is desorbed (so as to leave the adsorptive functional group 2a alone), whereby the wettability of the desorbed face 7 and that of the undesorbed face 8 differ from each other. Also, as shown in FIG. 3B, a part of the self-assembling compound 2 on the desorbed face 7 may completely be desorbed, while only the aliphatic compound residue 2b may be desorbed in the remaining self-assembling compound 2. It is due to the fact that, depending on the combination of the self-assembling compound and substrate used, there are cases where the desorption of the self-assembling compound 2 from the substrate 1 is preferentially carried out, where the desorption (decomposition) of the aliphatic compound residue 2b from the self-assembling composition 2 is preferentially carried out, and where the adsorptive functional group 2a is desorbed from the substrate 1 after the aliphatic compound residue 2b is desorbed (decomposed) from the self-assembling compound 2 (see *9: Masahiko Hara et al., Journal of Applied Physics, Japan, Vol. 64, No. 12 (1995), 1234–1238).

Figure 2D:
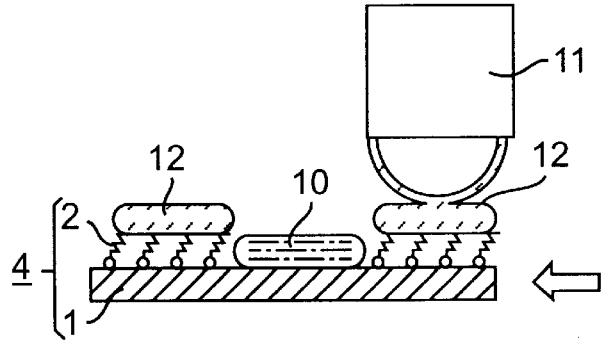
Figure 2C:
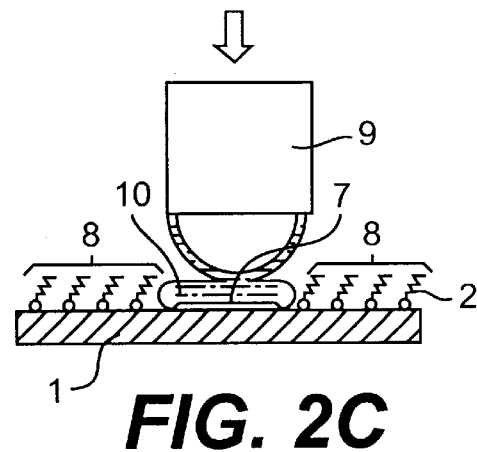

Subsequently, moisture (which may contain additives and the like) 10 is supplied to the surface of the image forming body 4 from a moisture supply device 9 (moisture supply step S104). FIG. 2C shows a case where the desorbed face 7 is hydrophilic and lipophilic, whereas the undesorbed face 8 is water-repellent and lipophilic, whereby the moisture 10 preferentially adheres to the desorbed face 7.

Thereafter, ink (oil ink) 12 is supplied to the surface of the image forming body 4 from a developing device 11 (developing step S105). As shown in FIG. 2D, the ink 12 preferentially adheres to the lipophilic undesorbed face 8, while bypassing the desorbed face 7 provided with the moisture 10 attached thereto, thereby forming an ink image.

Figure 2E:
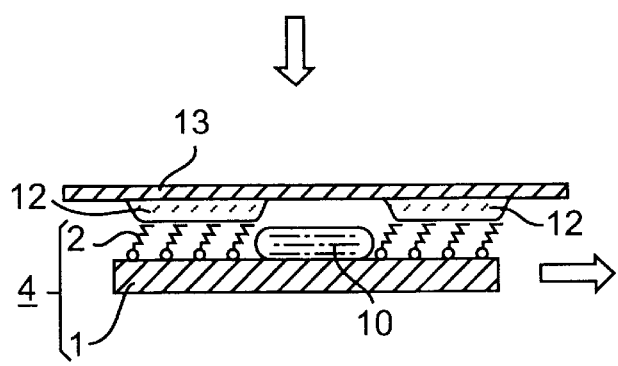

Then, as shown in FIG. 2E, a recording medium 13 abuts against the image forming body 4, whereby the ink 12 attached to the surface of the image forming body 4 is transferred to the recording medium 13 (transfer step S106). Hence, the first printing sequence (printing process) is completed.

If a plurality of sheets of the same image are to be copy-printed subsequently (S108: "No"), the untransferred ink 12 attached to the surface of the image forming body 4 is eliminated (untransferred ink eliminating step S107), and then the moisture supply step S104, developing step S105, transfer step S106, and untransferred ink eliminating step S107 are repeated a predetermined times as indicated by A in FIG. 1. Here, it is not always necessary to carry out the untransferred ink elimination and moisture supply each time.

Thus, in the image forming method of the present invention, the same printing plate can be used repeatedly. Consequently, in accordance with the present invention, it is not necessary to form a latent image per sheet as required in the conventional electrophotographic printer, whereby high-speed printing is possible.

Figure 2F:
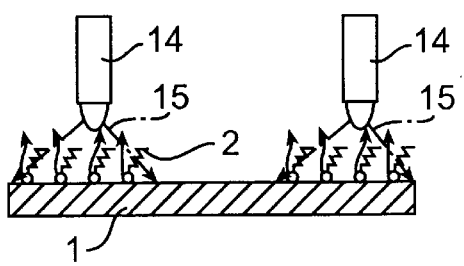

After the copy printing of a desired number of sheets is completed (S108: "Yes"), thermal energies 15 are applied to the self-assembling compound 2 forming the undesorbed face 8 from second thermal heads 14 as shown in FIG. 2F, so as to desorb the self-assembling compound 2 from the surface of the image forming body 4. As a consequence, the whole surface of the image forming body 4 becomes a desorbed face (second desorbing step S109). Thereafter, as indicated by B in FIG. 1, the self-assembling compound 2 is supplied to the surface of the image forming body 4 again, whereby the self-assembling monomolecular film is formed on the above-mentioned desorbed face again (second film forming step S101). Then, as the above-mentioned various steps (S101 to S109) are repeated, a desired number of sheets are copy-printed for each of a plurality of images.

Figure 4:
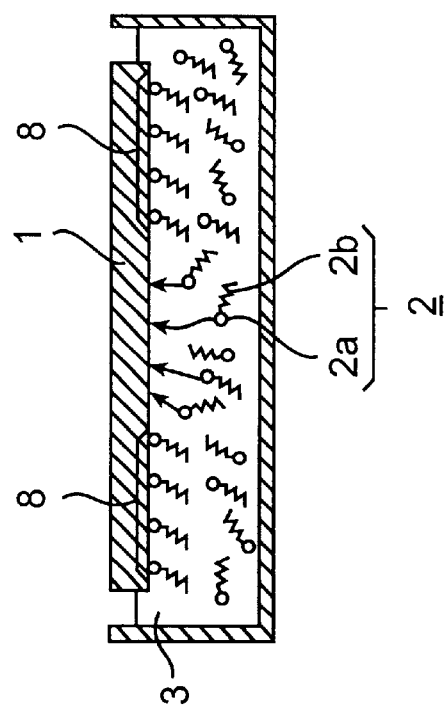
FIG. 4 is a schematic view in section showing an example of the state in which a self-assembling monomolecular film is re-formed in the image forming body in accordance with the present invention.

Here, in the case where the above-mentioned second desorbing processing S109 is carried out, the uniformity of the re-formed self-assembling monomolecular film tends to improve. However, since the self-assembling compound 2 tends to be adsorbed to the desorbed face 7 alone, as shown in FIG. 4, so as to re-form the monomolecular film in this part (see *9), the second desorbing step S109 is not always necessary.

Thus, in the image forming method of the present invention, the same image forming body can repeatedly be used for a plurality of images, and the forming and erasing of the printing plate is possible by simple processing operations of immersion to a solution and heating. Therefore, in accordance with the present invention, complicated devices for discarding stencils and winding new stencils, which have been necessitated in the conventional mimeograph printer, are unnecessary, whereby high-speed image formation is possible by a small-sized, simple apparatus.

Though preferred embodiments of the image forming method and platemaking method in accordance with the present invention is explained in detail in the foregoing, the methods of the present invention should not be restricted to the above-mentioned embodiments.

For example, though one kind of self-assembling compound is used in the above-mentioned embodiment, a mixture of at least two kinds of self-assembling compounds may be used as well. In the following, an embodiment using two kinds of self-assembling compounds will be explained with reference to FIGS. 1 and 5A to 5F.

Namely, first in this embodiment, a surface of a substrate 1 is immersed in a mixed solution 3 of two kinds of self-assembling compounds 2 ($2_1$, $2_2$) having main chain lengths different from each other, so as to supply these self-assembling compounds 2 ($2_1$, $2_2$) to the surface of the substrate 1. Consequently, as shown in FIG. 5A, two kinds of self-assembling compounds 2 ($2_1$, $2_2$) are mixed together and are substantially uniformly arranged at and adsorbed to the surface (solid-liquid interface) of the substrate 1 in a spontaneous manner, so as to form an adsorption film of a monomolecular film (self-assembling monomolecular film), thereby yielding an image forming body 4 (first film forming step S101). Here, each of the two kinds of self-assembling compounds 2 ($2_1$, $2_2$) is constituted by an adsorptive functional group $2a_1$, $2a_2$, and an aliphatic compound residue $2b_1$, $2b_2$ combined to the adsorptive functional group. As shown in FIG. 5B, the adsorptive functional group $2a_1$, $2a_2$ is adsorbed to the surface of the substrate 1, whereas the terminal of the aliphatic compound residue $2b_1$, $2b_2$ is exposed to the surface of the self-assembling monomolecular film (the face on the exposed side). Then, as shown in FIG. 5B, a minute uneven structure is formed on the surface of the self-assembling monomolecular film due to the difference in main chain length of the aliphatic compound residue $2b_1$, $2b_2$.

Subsequently, after the self-assembling monomolecular film is subjected to the washing/drying processing (washing/drying step S102) as required, thermal energy 6 is selectively applied to the self-assembling compound 2 ($2_1$, $2_2$) from a thermal head 5, as shown in FIG. 5B, so as to selectively desorb the self-assembling compound 2 ($2_1$, $2_2$) from the surface of the image forming body 4 (first desorbing step S103).

In the desorption of the above-mentioned self-assembling compound 2 ($2_1$, $2_2$), the self-assembling compound 2 ($2_1$, $2_2$) to be desorbed is not needed to be desorbed completely from the substrate 1. It will be sufficient if, as shown in FIG. 6A, at least the aliphatic compound residue $2b_1$, $2b_2$ is desorbed (so as to leave the adsorptive functional group $2a_1$, $2a_2$ alone), whereby the wettability of the desorbed face 7 and that of the undesorbed face 8 differ from each other. Also, as shown in FIG. 6B, a part of the self-assembling compound 2 ($2_1$, $2_2$) on the desorbed face 7 may completely be desorbed, while only the aliphatic compound residue $2b_1$, $2b_2$ may be desorbed in the remaining self-assembling compound 2 ($2_1$, $2_2$).

Subsequently, after moisture 10 from a moisture supply device 9 and ink (oil ink) 12 from a developing device 11 are successively supplied to the surface of the image forming body 4 (moisture supply step S104 and developing step S105) as shown in FIGS. 5C and 5D, the ink 12 is transferred to the recording medium 13 (transfer step S106) as shown in FIG. 5E.

Then, after the above-mentioned various steps (S104 to S107) are repeated as indicated by A in FIG. 1 to complete the copy printing of a desired number of sheets (S108: "Yes"), thermal energy 15 from halogen lamps 14 is applied to the self-assembling compound 2 ($2_1$, $2_2$) forming the undesorbed face 8, as shown in FIG. 5F, so as to desorb the self-assembling compound 2 from the surface of the image forming body 4 (second desorbing step S109). Thereafter, as indicated by B in FIG. 1, the self-assembling compound 2 ($2_1$, $2_2$) is supplied to the surface of the image forming body 4 again, whereby the self-assembling monomolecular film is formed on the above-mentioned desorbed face again (second film forming step S101). Then, as the above-mentioned various steps (S101 to S109) are repeated, the copy printing of a desired number of sheets is carried out for each of a plurality of images.

Here, since the self-assembling compound 2 ($2_1$, $2_2$) tends to be adsorbed to the desorbed face 7 alone, as shown in FIG. 7, so as to re-form the monomolecular film in this part (see *9) in this embodiment as well, the second desorbing step S109 is not always necessary.

In this embodiment, since the minute uneven structure formed on the surface of the self-assembling monomolecular film sufficiently prevents minute droplets from remaining on the surface, prints are prevented from getting soiled due to the remaining ink, and the prints are prevented from being whitened or the printing density from getting unstable due to the remaining moisture, whereby a higher resolution tends to be realized.

Though a self-assembling monomolecular film is formed by means of self-assembling compounds having main chain lengths different from each other in the above-mentioned embodiment, self-assembling compounds 2 ($2_1$, $2_3$) having steric configurations different from each other may be used, as shown in FIG. 8, to form a self-assembling monomolecular film 4. Also in this case, two kinds of self-assembling compounds 2 ($2_1$, $2_3$) are mixed together on the surface (solid-liquid interface) of the substrate 1 and substantially uniformly arranged and desorbed in a spontaneous manner, so as to form an adsorptive film of a monomolecular layer (self-assembling monomolecular film), thereby yielding an image forming body 4. Then, on the surface of the self-assembling monomolecular film, as shown in FIG. 8, a minute uneven structure is formed due to the difference in steric configuration of the aliphatic compound residues $2b_1$, $2b_3$.

Also, though two kinds of self-assembling compounds are used for forming a self-assembling monomolecular film in the above-mentioned embodiment, three or more kinds may be used for forming a self-assembling monomolecular film.

Further, the above-mentioned embodiment indicates, as a method of forming the self-assembling monomolecular film, a method in which the substrate is immersed in a solution. As such a self-assembling monomolecular film forming method, however, a method in which the solution is sprayed to the substrate as will be mentioned later, or a method in which the solution is supplied to the substrate by way of a roller or blade may be employed as well.

Also, the above-mentioned embodiment indicates, as a method of desorbing the self-assembling compound, a method based on heating utilizing a thermal head, and a method based on heating by light irradiation utilizing halogen lamps. However, as such a desorbing method, a method spraying a solvent and a method (see *10: J. Huang et al., Langmuir, 10 (1994), 626–628) utilizing a photodecomposition reaction upon irradiation of light (e.g., ultraviolet rays) may be employed, without being restricted to the above-mentioned heating method.

The above-mentioned embodiment indicates a case where the desorbed face is hydrophilic and lipophilic, whereas the undesorbed face is water-repellent and lipophilic, in which oil ink is used. However, water ink may be used. In this case, since the water ink preferentially adheres to the desorbed face 7, the moisture supply step S104 becomes unnecessary. Also, the desorbed face may be hydrophilic and lipophilic whereas the undesorbed face is water- and oil-repellent. In this case, since the oil ink preferentially adheres to the desorbed face 7, the moisture supply step S104 similarly becomes unnecessary.

In the following, preferred embodiments of the image forming apparatus in accordance with the present invention will be explained in detail with reference to FIGS. 9 to 25. Among the drawings, parts identical or equivalent to each other will be referred to with numerals or letters identical to each other.

Embodiment 1

Figure 9:
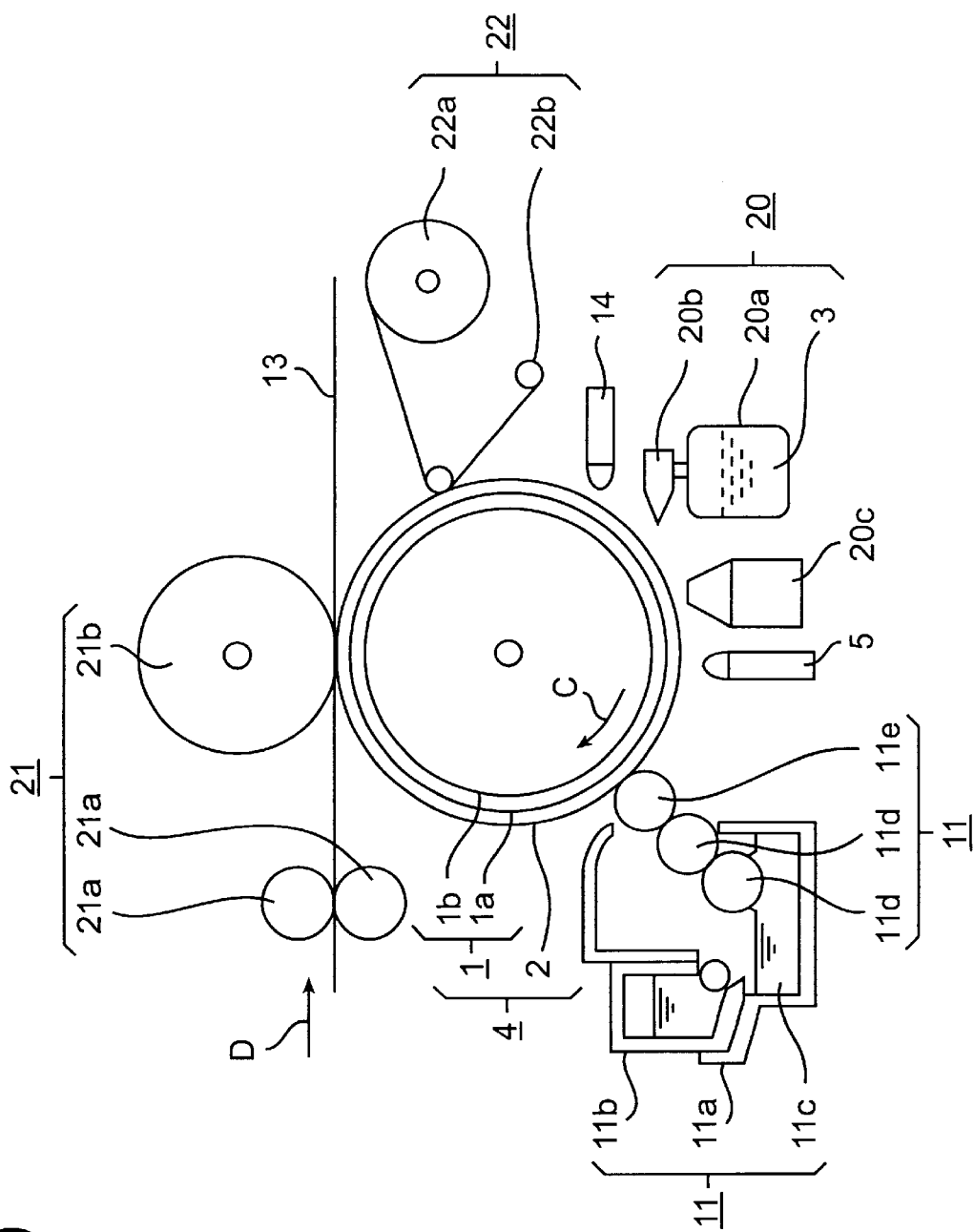
FIG. 9 is a schematic view showing a preferred embodiment of the image forming apparatus in accordance with the present invention.

FIG. 9 is a schematic view showing a preferred embodiment of the image forming apparatus in accordance with the present invention. A drum 1b whose surface has a gold film 1a deposited thereon is used as an image forming substrate 1. The above-mentioned drum 1b is axially supported so as to be rotatable, and is driven to rotate in the direction of arrow C. The configuration of the image forming apparatus (printer) will be explained successively along the rotationally advancing direction of the drum 1b.

Installed under the drum 1b is a film forming device (first film forming device) 20 for forming a self-assembling monomolecular film made of a self-assembling compound 2 onto the surface of the gold film 1a. The film forming device 20 is constituted by a solution cartridge 20a filled with a solution 3 of the self-assembling compound 2 and a solution sprayer 20b. Filled in the solution cartridge 20a is an n-hexane solution in which fluorodecanethiol-2 expressed by the following formula:

$C_8F_{17}(CH_2)_2SH$ has been dissolved. Installed downstream thereof is a fan 20c for drying the surface of the gold film 1a supplied with the n-hexane solution from the film forming device 20.

Subsequently installed is a first thermal head (first desorbing device) 5 for selectively heating the surface of the image forming body 4 formed with the self-assembling monomolecular film made of fluorodecanethiol-2, so as to form a printing plate.

Further installed is a developer (developing device) 11 for forming an ink image on the image forming body 4. The developer 11 is constituted by an ink feeder 11a, an ink cartridge 11b, ink (oil ink) 11c, an ink feeding roller 11d, and an ink applying roller 11e.

Installed above the drum 1b is a transfer device 21 for transferring the ink image formed onto the image forming body 4 by the developer 11 to a recording medium 13. The transfer device 21 is constituted by a paper-feed roller 21a and a platen roller 21b.

Further installed is an ink cleaner 22 for eliminating the untransferred ink on the drum 1b. The ink cleaner 22 is constituted by a cleaning buff 22a and a take-up shaft 22b.

Finally installed is a second thermal head (second desorbing device) 14 for heating the whole surface of the image forming body 4 so as to desorb the self-assembling compound 2. Here, the above-mentioned first film forming device 20 also acts as a second film forming device for re-forming a self-assembling monomolecular film onto the image forming body 4 from which the self-assembling compound 2 has been eliminated from the whole surface thereof by the second thermal head 14.

Operations in the above-mentioned apparatus will now be explained.

First, the second thermal head 14 is used for heating the whole surface of the gold film 1a, thereby eliminating the impurities on the surface of the gold film 1a. As a consequence, a denser self-assembling monomolecular film can be formed.

Figure 10:
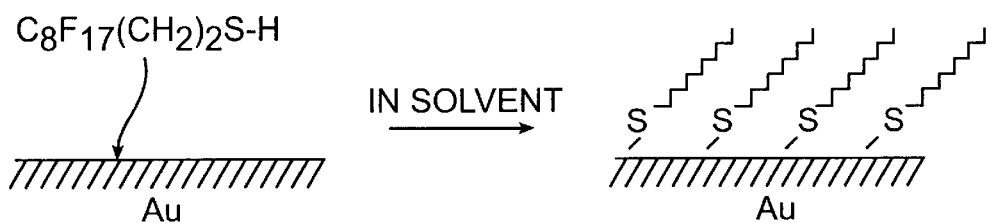
FIG. 10 is a schematic view in section showing an example of the state in which a self-assembling compound in accordance with the present invention is adsorbed to a substrate surface.

Next, the n-hexane solution in which fluorodecanethiol-2 has been dissolved is uniformly applied to the surface of the gold film 1a by the solution sprayer 20b of the film forming device 20. Then, the surface of the gold film 1a coated with the above-mentioned n-hexane solution is dried by the fan 20c. A self-assembling monomolecular film made of fluorodecanethiol-2 is uniformly formed on the dried gold film 1a as shown in FIG. 10.

Figure 11:
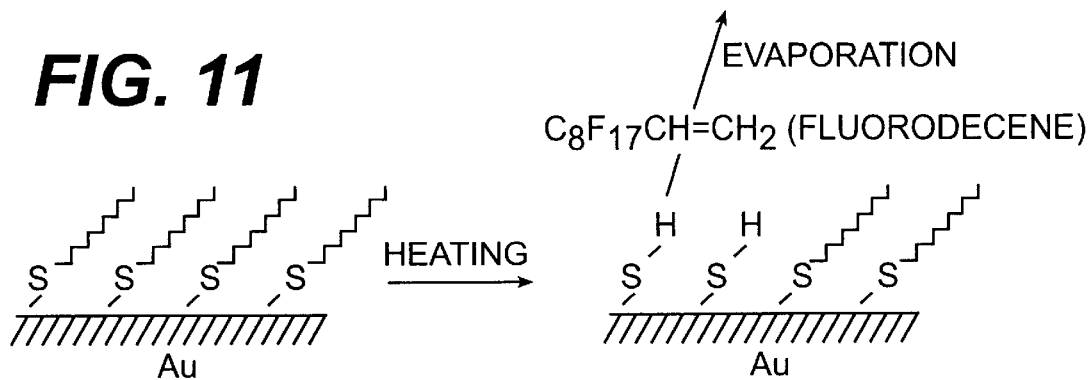
FIG. 11 is a schematic view in section showing an example of the state in which the self-assembling compound in accordance with the present invention is selectively desorbed from the substrate surface.

Subsequently, the first thermal head 5 is caused to act on the surface of the gold film 1a uniformly formed with the self-assembling monomolecular film 2, so as to selectively heat the self-assembling monomolecular film 2, whereby fluorodecene is selectively desorbed as shown in FIG. 11.

Thus, the surface (desorbed face) of the gold film 1a from which fluorodecene has thus been desorbed becomes a surface combined with —SH. The surface (undesorbed face) covered with the self-assembling monomolecular film 2 is water- and oil-repellent, whereas the surface (desorbed face) in which —SH is combined to the gold film 1a is hydrophilic and lipophilic. Thus, the surface of the image forming body 4 would partly have different wettabilities. As a consequence, the selective heating by the first thermal head 5 can form any printing plate on the surface of the image forming body 4.

Subsequently, as the oil ink 11c is supplied to the surface of the image forming body 4 formed with the printing plate when the printing plate passes through the developer 11, an ink image is formed. Since the surface (undesorbed face: non-image area) covered with the self-assembling monomolecular film 2 is oil-repellent, the oil ink 11c would not adhere thereto and only adheres to the desorbed face (image area) which is lipophilic. Here, while the film thickness of the ink 11c is adjusted by the surface roughness of the ink feeding roller 11d and ink applying roller 11e and by the pressure between the image forming body 4 and the ink feeding roller 11d and ink applying roller 11e, the oil ink 11c is supplied onto the image forming body 4.

The recording medium 13 is fed by the paper-feed roller 21a, along the direction of arrow D, in synchronization with the rotation of the image forming body 4. The recording medium 13 is pressed against the image forming body 4 by the platen roller 21b, and the ink image is transferred from the image forming body 4 to the recording medium 13 while the recording medium is being pressed against the image forming body 4. Thereafter, the recording medium 13 having the ink image transferred thereto is ejected along the direction of arrow D (no paper-ejecting mechanism being depicted).

Untransferred ink may remain on the surface of the image forming body 4 that has completed the above-mentioned printing step. The remaining untransferred ink is scraped off by the ink cleaner 22. The cleaning buff 22a having scraped off the untransferred ink is taken up by the take-up shaft 22b. Here, the scraping of untransferred ink need not necessarily be carried out per sheet but can be effected after a specific number of sheets are printed (e.g., per 5 or 10 sheets) at the copy printing using the same printing plate. The ink cleaner 22 is spaced from the image forming body 4 when not used for scraping off the untransferred ink.

When a plurality of sheets are copy-printed for the same image, it is not necessary for the film forming step and printing plate forming step to be re-executed. Hence, the image forming body 4 is fed to the developer 11 while holding the printing plate. During this period, the thermal heads 5, 14 are not heated. Also, it is preferred that, after the heating step or printing plate forming step is completed, the thermal heads 5, 14 be spaced from the image forming body 4 so that the self-assembling compound 2 is not desorbed by their residual heat. In the developer 11, the oil ink 11c is supplied to the surface of the image forming body 4, and the re-formed ink image is transferred to the recording medium 13.

Figure 12:
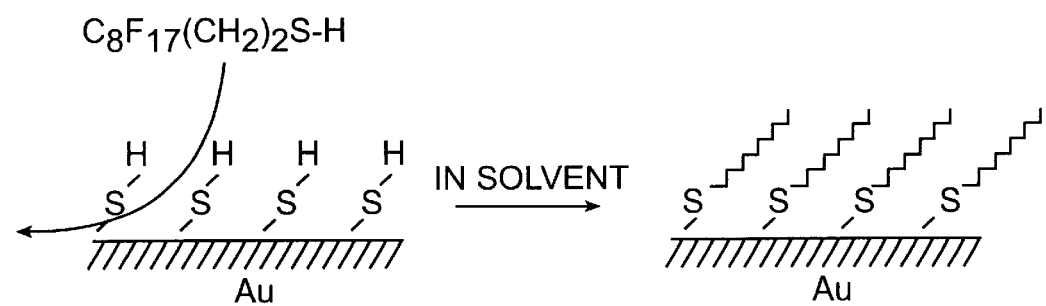
FIG. 12 is a schematic view in section showing an example of the state in which the self-assembling compound in accordance with the present invention is adsorbed to the substrate surface again.

After a desired number of sheets are copy-printed, the second thermal head 14 approaches the drum 1b, thereby heating the whole surface of the image forming body 4. Consequently, as with the reaction shown in FIG. 11, fluorodecene is desorbed from the whole surface of the gold film 1a. Therefore, the surface of the gold film 1a from which fluorodecene has been desorbed becomes a surface combined with —SH. Subsequently, when printing a new printing pattern, the process is executed from the step of re-forming the self-assembling monomolecular film 2 onto the surface of the gold film 1a. Namely, in the film forming device 20, the n-hexane solution 3 containing fluorodecanethiol-2 dissolved therein is applied to the surface of the gold film 1a by the solution sprayer 20b, and the surface of the gold film 1a is dried by the fan 20c, whereby the surface of the gold film 1a can be re-modified with the self-assembling monomolecular film 2 as shown in FIG. 12. Then, with the subsequent steps similar to those mentioned above, the new printing pattern can be printed.

Embodiment 2

Figure 13:
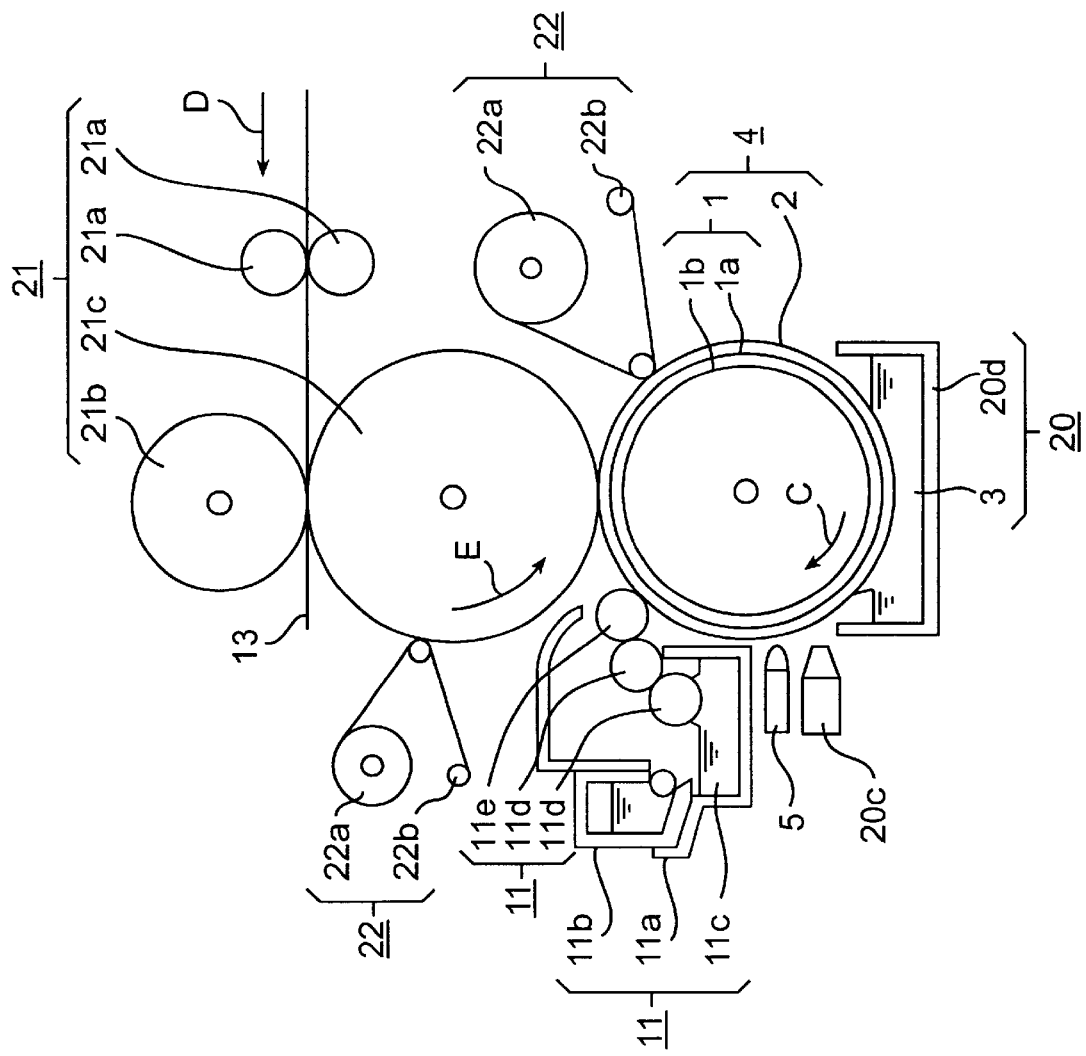
FIG. 13 is a schematic view showing another preferred embodiment of the image forming apparatus in accordance with the present invention.

FIG. 13 is a schematic view showing another preferred embodiment of the image forming apparatus in accordance with the present invention. Embodiments 1 and 2 differ from each other in the film forming device for forming the self-assembling monomolecular film onto the surface of the drum, the self-assembling compound and ink used, the transfer device for the image to the recording medium, and the device concerning the step of re-forming the self-assembling monomolecular film.

Namely, a solvent bath 20d for forming the self-assembling monomolecular film is installed under the drum 1b. The solvent bath 20d stores an ethyl acetate solution in which decanethiol-2 expressed by the following formula:

$$C_{10}H_{21}SH$$

has been dissolved. This solvent bath 20d constitutes a film forming device (acting as both first and second film forming devices) 20.

The ink feeder (developing device) 11 is filled with water ink 11c, whereas the configurations of the other devices (fan 20c, first thermal head 5, and developing device 11) concerning the printing plate forming step (first desorbing step) and developing step are similar to those in Embodiment 1. Also, the transfer device 21 in accordance with this embodiment is constituted by a transfer drum 21c, a paper-feed roller 21a, and a platen roller 21b, whereas the transfer drum 21c rotates along the direction of arrow E in synchronization with the rotation of the image forming body 4. In this embodiment, the transfer drum 21c is also provided with the ink cleaner 22. Further, no second thermal head 14 is provided in this embodiment.

Operations in the above-mentioned apparatus will now be explained.

Figure 14:
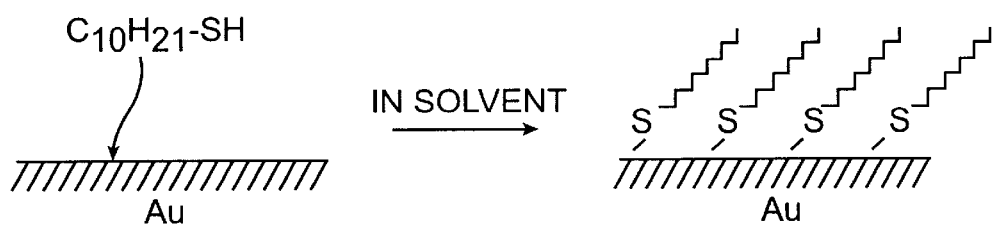
FIG. 14 is a schematic view in section showing another example of the state in which the self-assembling compound in accordance with the present invention is adsorbed to the substrate surface.

The drum 1b having the gold film 1a is rotated, while in a state where the lower end thereof is immersed in the solution 3 stored in the solvent bath 20d, along the direction of arrow C, whereby the ethyl acetate solution containing decanethiol-2 dissolved therein is uniformly supplied to the surface of the gold film 1a. Then, the surface of the gold film 1a supplied with the above-mentioned solution is dried by the fan 20c. The self-assembling monomolecular film made of decanethiol-2 is uniformly formed on the dried surface of the gold film 1a as shown in FIG. 14.

Figure 15:
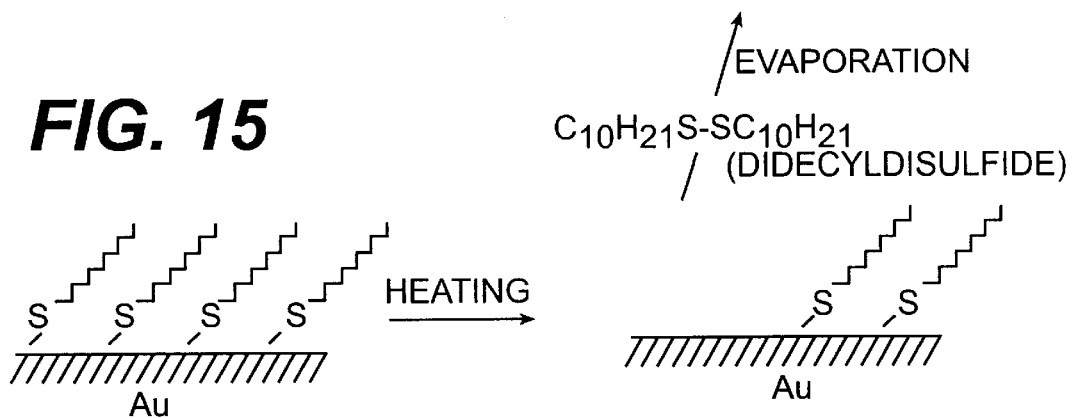
FIG. 15 is a schematic view in section showing another example of the state in which the self-assembling compound in accordance with the present invention is selectively desorbed from the substrate surface.

Subsequently, the first thermal head 5 is caused to act on the surface of the gold film 1a uniformly formed with the self-assembling monomolecular film 2, so as to selectively heat the self-assembling monomolecular film 2, whereby didecyldisulfide is selectively desorbed as shown in FIG. 15. Thus, decanethiolate is dimerized, and didecyldisulfide is mainly evaporated.

Thus, the surface (desorbed face) of the gold film 1a from which decanethiolate has been desorbed becomes a clean face. The surface (undesorbed face) covered with the self-assembling monomolecular film (decanethiolate) 2 is water-repellent and lipophilic, whereas the clean face (desorbed face) to which the gold film 1a is exposed is hydrophilic and lipophilic. Thus, the surface of the image forming body 4 would partly have different wettabilities. As a consequence, the selective heating by the first thermal head 5 can form any printing plate on the surface of the image forming body 4.

Subsequently, as the water ink 11c is supplied to the surface of the image forming body 4 formed with the printing plate when the printing plate passes through the developer 11, an ink image is formed. Since the surface (undesorbed face: non-image area) covered with the self-assembling monomolecular film 2 is water-repellent, the water ink 11c would not adhere thereto and only adheres to the desorbed face (image area) which is hydrophilic.

The recording medium 13 is fed by the paper-feed roller 21a, along the direction of arrow D, in synchronization with the rotation of the transfer drum 21c. The recording medium 13 is pressed against the transfer drum 21c by the platen roller 21b. During the period when the recording medium 13 abuts against the transfer drum 21c, the ink image is transferred from the transfer drum 21c to the recording medium 13.

After the above-mentioned transfer printing step is completed, the untransferred ink remaining on the surfaces of image forming body 4 and transfer drum 21c is scraped off by the ink cleaner 22. When a plurality of sheets are copy-printed for the same image, as with Embodiment 1, it is not necessary for the film forming step and printing plate forming step to be re-executed. Hence, the image forming body 4 is fed to the developer 11 while holding the printing plate, where the ink image is formed again, and then to the transfer device 21, where the ink image is transferred to the recording medium 13 again.

Figure 16:
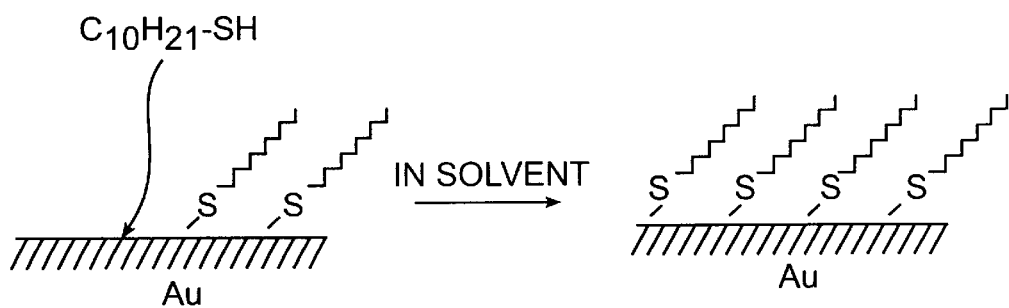
FIG. 16 is a schematic view in section showing an example of the state in which the self-assembling compound in accordance with the present invention is adsorbed to the substrate surface again.

Then, after a desired number of sheets are copy-printed, a self-assembling monomolecular film for printing a new printing pattern is formed again. Namely, the drum 1b having the gold film 1a is rotated, while in a state where the lower end thereof is immersed in the solution 3 stored in the solvent bath 20d, along the direction of arrow C, whereby the ethyl acetate solution containing decanethiol-2 dissolved therein is uniformly supplied to the surface of the gold film 1a. Then, the surface of the gold film 1a supplied with the above-mentioned solution is dried by the fan 20c. The self-assembling monomolecular film made of decanethiol-2 is uniformly formed again on the dried surface of the gold film 1a as shown in FIG. 16.

When printing a new printing pattern, the process is executed from the step of causing the first thermal head 5 to selectively act on the surface of the gold film 1a re-formed with the self-assembling monomolecular film, so as to form a printing plate. Thus, it is preferred that the self-assembling monomolecular film for the next printing process have been re-formed on the surface of the gold film 1a at the time when the printing is completed. As a consequence, when the next user starts printing, the step of forming the self-assembling monomolecular film can be omitted, whereby the printing time is shortened.

Since Embodiment 2 is configured such that the solvent bath 20d is used for forming a film, the self-assembling compound 2 needed for forming the self-assembling monomolecular film can be reduced. Also, though there is a possibility of the image forming body 4, which is constituted by the drum 1b with the gold film 1a deposited thereon, being damaged when the recording medium 13 directly comes into contact therewith, the image forming body 4 would not be damaged or soiled by the recording medium 13 in this embodiment since the transfer drum 21c is used for the transfer to the recording medium 13. On the other hand, Embodiment 1 has the advantage over Embodiment 2 in that the apparatus can be made smaller as compared with Embodiment 2, since no transfer drum 21c is used.

Embodiment 3

Figure 17:
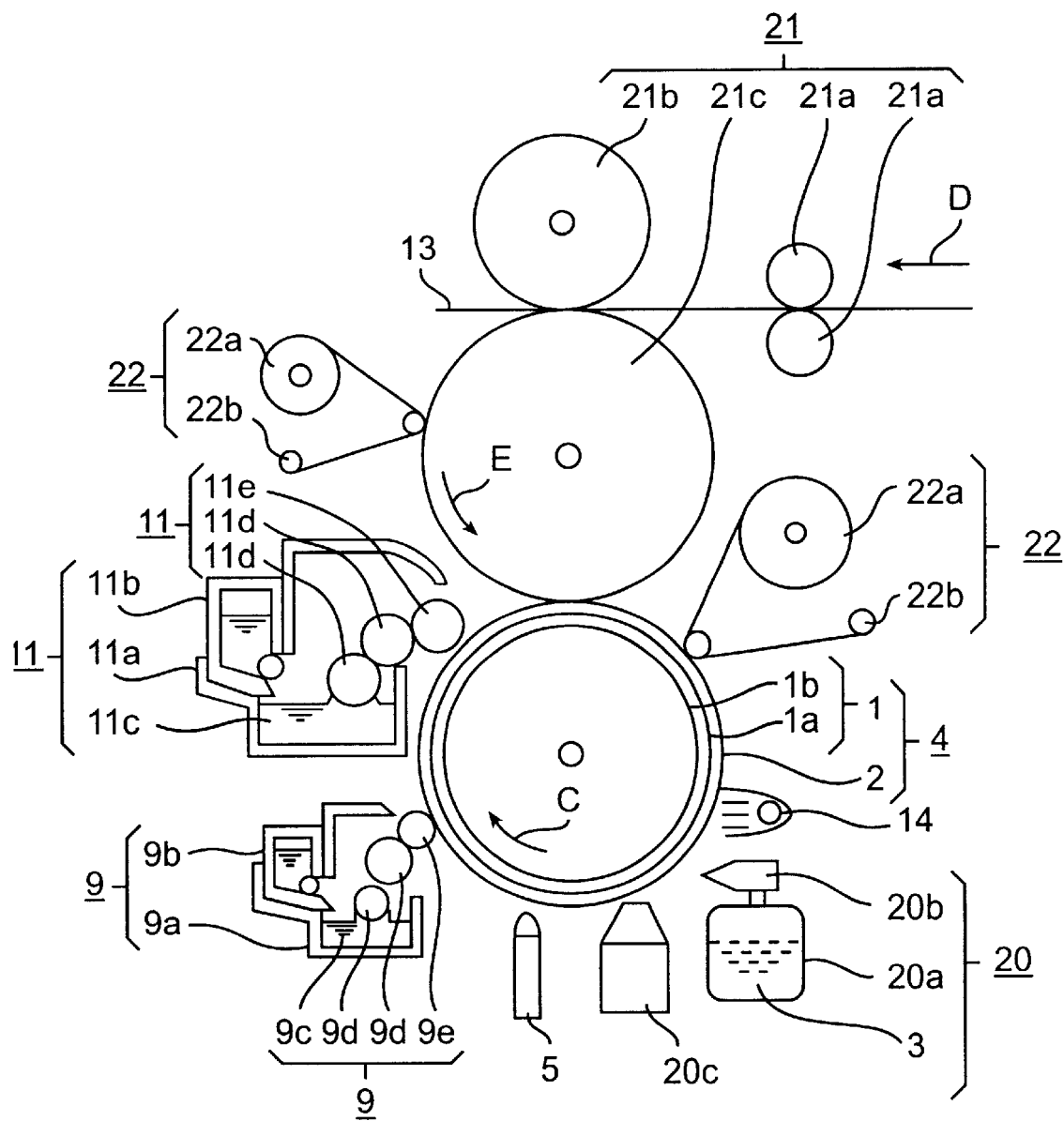
FIG. 17 is a schematic view showing still another preferred embodiment of the image forming apparatus in accordance with the present invention.

FIG. 17 is a schematic view showing another preferred embodiment of the image forming apparatus in accordance with the present invention. Embodiments 1 and 3 differ from each other in the self-assembling compound used for forming the self-assembling monomolecular film, the device concerning the developing step, the transfer device for the image onto the recording medium, and the device concerning the step of re-forming the self-assembling monomolecular film.

Namely, installed under the drum 1b is a film forming device 20 for forming a self-assembling monomolecular film, and a solution cartridge 20a is filled with an n-hexane solution in which a mixture of decanethiol $2_2$ expressed by the following formula:

$$C_{10}H_{21}SH$$

and pentadecanethiol $2_2$ expressed by the following formula:

$$C_{15}H_{31}SH$$

has been dissolved.

Also installed in this embodiment is a moisture supply device (dampening device) 9 for supplying moisture to the desorbed face (non-image area) of the image forming body 4 formed with the printing plate with the first thermal head 5. Otherwise, the configurations of the devices (fan 20c, first thermal head 5, and developing device 11) concerning the printing plate forming step (first desorbing step) and developing step are similar to those in Embodiment 1. The moisture supply device 9 is constituted by a moisture dispenser 9a, a moisture cartridge 9b, moisture (dampening solution) 9c, a moisture supply roller 9d, and a moisture applying roller 9e. The transfer device 21 in accordance with this embodiment is constituted by a transfer drum 21c, a paper-feed roller 21a, and a platen roller 21b as with Embodiment 2. Further, in this embodiment, a halogen lamp 14 is installed as the second desorbing device in place of the second thermal head.

Operations in the above-mentioned apparatus will now be explained.

Figure 18:
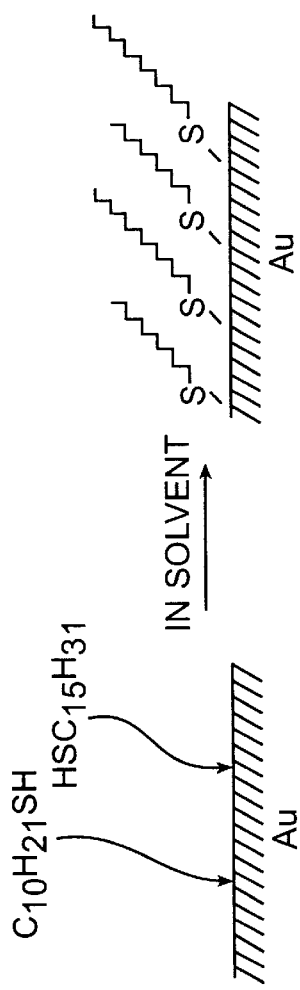
FIG. 18 is a schematic view in section showing still another example of the state in which the self-assembling compound in accordance with the present invention is adsorbed to the substrate surface.

First, the halogen lamp 14 is used for heating the whole surface of the gold film 1a so as to eliminate impurities, and then the n-hexane solution containing the mixture of decanethiol $2_2$ and pentadecanethiol $2_1$ dissolved therein is supplied to the surface of the gold film 1a by the solution sprayer 20b of the film forming device 20. Thereafter, the surface of the gold film 1a supplied with the above-mentioned n-hexane solution is dried by the fan 20c. As shown in FIG. 18, the dried surface of the gold film 1a is uniformly formed with a self-assembling monomolecular film 2 made of the mixture of decanethiol $2_2$ and pentadecanethiol $2_1$, and a minute (micro) uneven structure is formed on the surface of the film.

Figure 19:
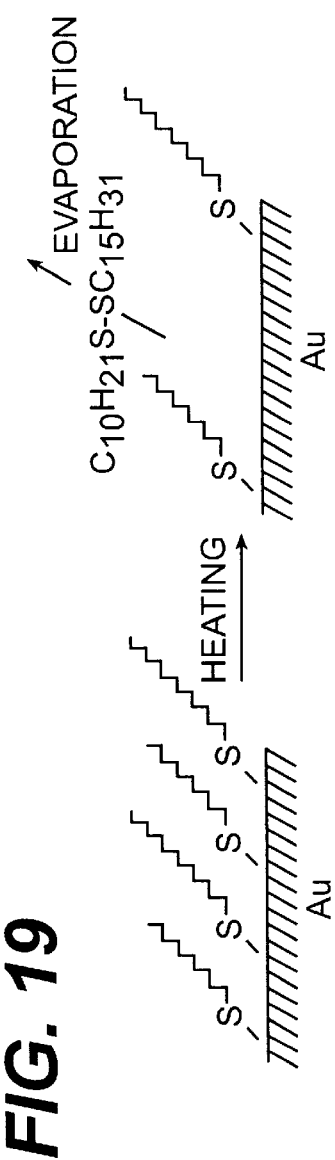
FIG. 19 is a schematic view in section showing still another example of the state in which the self-assembling compound in accordance with the present invention is selectively desorbed from the substrate surface.

Subsequently, the first thermal head 5 is caused to act on the surface of the gold film 1a uniformly formed with the self-assembling monomolecular film 2, so as to selectively heat the self-assembling monomolecular film 2, whereby the self-assembling compound is selectively desorbed as shown in FIG. 19. The desorbed species are mainly constituted by decanethiol, pentadecanethiol, didecyldisulfide, dipentadecyldisulfide, and decylpentadecyldisulfide.

Thus, the surface (desorbed face) of the gold film 1a from which self-assembling compound has been desorbed becomes a clean face. The surface (undesorbed face) covered with the self-assembling monomolecular film 2 is water-repellent and lipophilic, whereas the clean face (desorbed face) is hydrophilic and lipophilic. Thus, the surface of the image forming body 4 would partly have different wettabilities. As a consequence, the selective heating by the first thermal head 5 can form any printing plate on the surface of the image forming body 4.

Subsequently, when the printing plate passes through the moisture supply device 9, the moisture 9c is supplied to the desorbed face (non-image area) of the surface of the image forming body 4 formed with the printing plate. Then, as the oil ink 11c is supplied to the surface of the image forming body 4 formed with the printing plate when the printing plate passes through the developer 11, an ink image is formed. Since the moisture 9c is attached to the surface (desorbed face: non-image area), the oil ink 11c would not adhere thereto and only adheres to the undesorbed face (image area) covered with the self-assembling monomolecular film 2. Subsequently, as with Embodiment 2, the ink image is transferred to the recording medium 13 in the transfer device 21.

After the above-mentioned transfer printing process is completed, the untransferred ink is scraped off by the ink cleaner 22 as with Embodiment 1. When a plurality of sheets are copy-printed for the same image, as with Embodiment 1, it is not necessary for the film forming step and printing plate forming step to be re-executed. Hence, the image forming body 4 is fed to the developer 11 while holding the printing plate, where the ink image is formed again, and then to the transfer device 21, where the ink image is transferred to the recording medium 13 again.

After the copy printing of a desired number of sheets is completed, the halogen lamp 14 approaches the drum 1b, so as to heat the whole surface of the image forming body 4. Consequently, as with the reaction shown in FIG. 19, the self-assembling compound 2 is desorbed from the whole surface of the gold film 1a. Hence, the surface of the gold film 1a from which the self-assembling compound 2 has been desorbed becomes a clean face. Subsequently, when printing a new printing pattern, the process is executed from the step of re-forming the self-assembling monomolecular film 2 onto the surface of the gold film 1a. Namely, the n-hexane solution 3 containing the mixture of decanethiol 22 and pentadecanethiol 21 dissolved therein is applied to the surface of the gold film 1a by the film forming device 20, and the surface of the gold film 1a is dried by the fan 20c, whereby the surface of the gold film 1a can be re-modified with the self-assembling monomolecular film 2 as shown in FIG. 18. Then, with the subsequent steps similar to those mentioned above, the new printing pattern can be printed.
Embodiment 4

Figure 20:
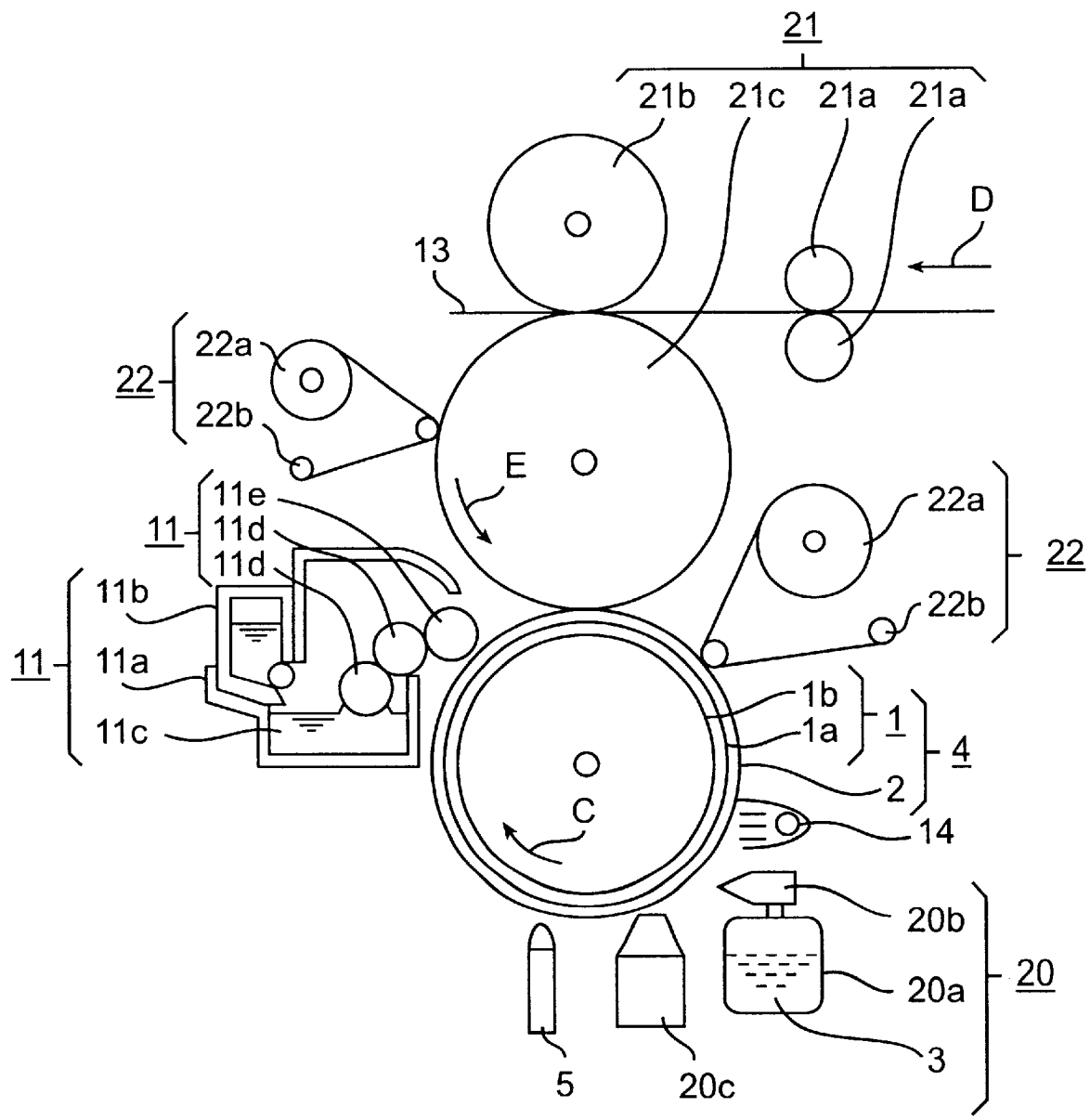
FIG. 20 is a schematic view showing still another preferred embodiment of the image forming apparatus in accordance with the present invention.

FIG. 20 is a schematic view showing another preferred embodiment of the image forming apparatus in accordance with the present invention. Embodiments 3 and 4 differ from each other in the self-assembling compounds used for forming the self-assembling monomolecular film. Since the wettability of the self-assembling monomolecular film formed is oil-repellent, the moisture supply device 9, which has been necessary in Embodiment 3, becomes unnecessary.

Namely, installed under the drum 1b is a film forming device 20 for forming a self-assembling monomolecular film, and a solution cartridge 20a is filled with an n-hexane solution in which a mixture of fluoropentadecanethiol 2, expressed by the following formula:

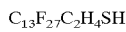

and hydroxydodecylhydroxynonyldisulfide $2_2$ expressed by the following formula:

have been dissolved. Here, though two kinds of self-assembling compounds in Embodiment 3 are both water-repellent repellent and lipophilic, a self-assembling monomolecular film may be formed by a combination of a water- and oil-repellent self-assembling compound and a hydrophilic and oil-repellent self-assembling compound as shown in Embodiment 4.

The configurations of the devices (first thermal head 5, developing device 11, transfer device 21, ink cleaner 22, and halogen lamp 14) concerning the printing plate forming step (first desorbing step), developing step, transfer printing step, untransferred ink eliminating step, and second desorbing step are similar to those in Embodiment 3.

Operations in the above-mentioned apparatus will now be explained.

Figure 21:
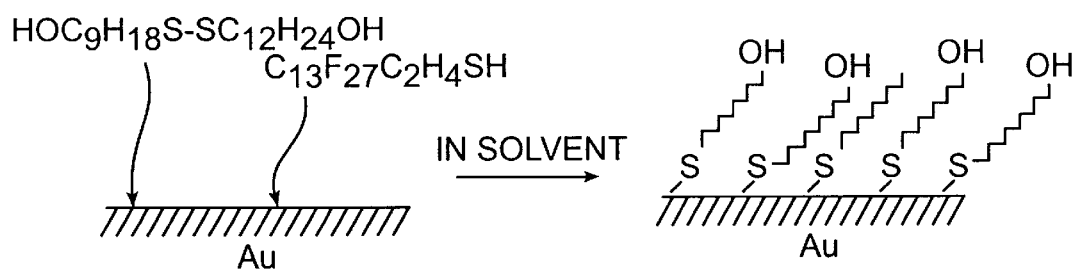
FIG. 21 is a schematic view in section showing still another example of the state in which the self-assembling compound in accordance with the present invention is adsorbed to the substrate surface.

First, the halogen lamp 14 is used for heating the whole surface of the gold film 1a so as to eliminate impurities, and then the n-hexane solution containing the mixture of fluoropentadecanethiol $2_1$ and hydroxydodecylhydroxynonyldisulfide $2_2$ dissolved therein is supplied to the surface of the gold film 1a by the solution sprayer 20b of the film forming device 20. Thereafter, the surface of the gold film 1a supplied with the above-mentioned n-hexane solution is dried by the fan 20c. As shown in FIG. 21, the dried surface of the gold film 1a is uniformly formed with a self-assembling monomolecular film 2 made of the mixture of fluoropentadecanethiol $2_1$ and hydroxydodecylhydroxynonyldisulfide $2_2$, and a minute (micro) uneven structure is formed on the surface of the film.

Figure 22:
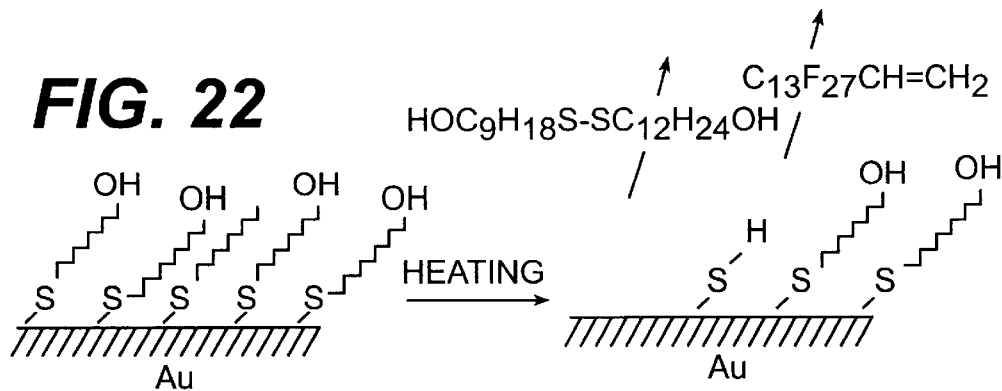
FIG. 22 is a schematic view in section showing still another example of the state in which the self-assembling compound in accordance with the present invention is selectively desorbed from the substrate surface.

Subsequently, the first thermal head 5 is caused to act on the surface of the gold film 1a uniformly formed with the self-assembling monomolecular film 2, so as to selectively heat the self-assembling monomolecular film 2, whereby at least a part of the self-assembling compound is selectively desorbed as shown in FIG. 22. The desorbed species are mainly constituted by fluoropentadecene and hydroxydodecylhydroxynonyldisulfide.

Thus, the surface (desorbed face) of the gold film 1a from which fluoropentadecene has been desorbed becomes a surface combined with —SH, whereas the surface (desorbed face) from which hydroxydodecylhydroxynonyldisulfide has been desorbed becomes a clean face. The surface combined with —SH and the clean face (desorbed face) both exhibit hydrophilic and lipophilic properties, whereas the surface (undesorbed face) covered with the self-assembling monomolecular film 2 exhibits hydrophilic and oil-repellant properties. Thus, the surface of the image forming body 4 would partly have different wettabilities. As a consequence, the selective heating by the first thermal head 5 can form any printing plate on the surface of the image forming body 4.

Subsequently, as oil ink 11c is supplied to the surface of the image forming body 4 formed with the printing plate when the printing plate passes through the developer 11, an ink image is formed. Since the surface (undesorbed face: non-image area) covered with the self-assembling monomolecular film 2 is oil-repellent, the oil ink 11c would not adhere thereto and only adheres to the desorbed face (image area). Subsequently, as with Embodiment 3, the ink image is transferred to the recording medium 13 in the transfer device 21.

After the above-mentioned transfer printing process is completed, the untransferred ink is scraped off by the ink cleaner 22 as with Embodiment 3. When a plurality of sheets are copy-printed for the same image, as with Embodiment 3, it is not necessary for the film forming step and printing plate forming step to be re-executed. Hence, the image forming body 4 is fed to the developer 11 while holding the printing plate, where the ink image is formed again, and then to the transfer device 21, where the ink image is transferred to the recording medium 13 again.

Figure 23:
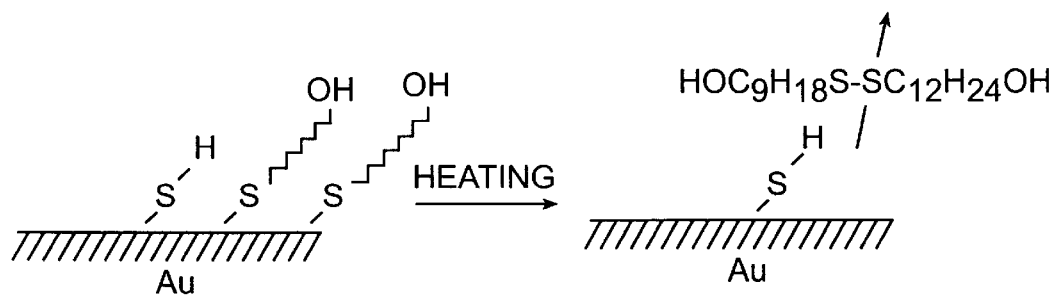
FIG. 23 is a schematic view in section showing still another example of the state in which the self-assembling compound in accordance with the present invention is desorbed from the whole substrate surface.

After the copy printing of a desired number of sheets is completed, the halogen lamp 14 heats the whole surface of the image forming body 4 as with Embodiment 3. Consequently, as shown in FIG. 23, the self-assembling compound 2 is desorbed from the whole surface of the gold film 1a. Here, the surface of the gold film 1a heated as a whole becomes a surface partly combined with —SH. Subsequently, when printing a new printing pattern, the process is executed from the step of re-forming the self-assembling monomolecular film 2 onto the surface of the gold film 1a. Namely, the n-hexane solution 3 containing the mixture of fluoropentadecanethiol $2_1$ and hydroxydodecylhydroxynonyldisulfide $2_2$ dissolved therein is supplied to the surface of the gold film 1a by the film forming device 20, and the surface of the gold film 1a is dried by the fan 20c, whereby the surface of the gold film 1a can be re-modified with the self-assembling monomolecular film 2 as with the reaction shown in FIG. 21. Then, with the subsequent steps similar to those mentioned above, the new printing pattern can be printed.
Embodiment 5

Embodiments 3 and 4 differ from Embodiment 5 in the self-assembling compounds used for forming the self-assembling monomolecular film. Since the wettability of the self-assembling monomolecular film formed is water- and oil-repellent, the moisture supply device 9, which has been necessary in Embodiment 3, becomes unnecessary, and the image forming apparatus shown in FIG. 20 is employed.

Namely, installed under the drum 1b is a film forming device 20 for forming a self-assembling monomolecular film, and a solution cartridge 20a is filled with an n-hexane solution in which a mixture of 2,2-difluoromethylfluoropentadecanethiol $2_3$ expressed by the following formula:

$$(CF_3)_3CC_{11}F_{22}C_2H_4SH$$

and fluorodecanethiol $2_1$ expressed by the following formula:

$$C_{10}F_{21}SH$$

has been dissolved.

The configurations of the devices (first thermal head 5, developing device 11, transfer device 21, ink cleaner 22, and halogen lamp 14) concerning the printing plate forming step (first desorbing step), developing step, transfer printing step, untransferred ink eliminating step, and second desorbing step are similar to those in Embodiment 3. In this embodiment, however, not only oil ink but also water ink can be used as ink 11c.

Operations in the above-mentioned apparatus will now be explained.

First, the halogen lamp 14 is used for heating the whole surface of the gold film 1a so as to eliminate impurities, and then the n-hexane solution containing the mixture of 2,2-difluoromethylfluoropentadecanethiol $2_3$ and fluorodecanethiol $2_1$ dissolved therein is supplied to the surface of the gold film 1a by the solution sprayer 20b of the film forming device 20. Thereafter, the surface of the gold film 1a supplied with the above-mentioned n-hexane solution is dried by the fan 20c. As shown in FIG. 24, the dried surface of the gold film 1a is uniformly formed with a self-assembling monomolecular film 2 made of the mixture of 2,2-difluoromethylfluoropentadecanethiol $2_3$ and fluorodecanethiol $2_1$, and a minute (molecular-level) uneven structure is formed on the surface of the film.

Subsequently, the first thermal head 5 is caused to act on the surface of the gold film 1a uniformly formed with the self-assembling monomolecular film 2, so as to selectively heat the self-assembling monomolecular film 2, whereby at least a part of the self-assembling compound is selectively desorbed as shown in FIG. 25. The desorbed species are mainly constituted by 2,2-difluoromethylfluoropentadecene and fluorodecene.

Thus, the surface (desorbed face) of the gold film 1a from which the self-assembling compound has been desorbed becomes a surface combined with —SH. The surface combined with —SH exhibits hydrophilic and lipophilic properties, whereas the surface (undesorbed face) covered with the self-assembling monomolecular film 2 exhibits water- and oil-repellent properties. Thus, the surface of the image forming body 4 would partly have different wettabilities. As a consequence, the selective heating by the first thermal head 5 can form any printing plate on the surface of the image forming body 4.

Subsequently, as the oil or water ink 11c is supplied to the surface of the image forming body 4 formed with the printing plate when the printing plate passes through the developer 11, an ink image is formed. Since the surface (undesorbed face: non-image area) covered with the self-assembling monomolecular film 2 is water- and oil-repellent, the ink 11c would not adhere thereto and only adheres to the desorbed face (image area). Subsequently, as with Embodiment 3, the ink image is transferred to the recording medium 13 in the transfer device 21.

After the above-mentioned transfer printing process is completed, the untransferred ink is scraped off by the ink cleaner 22 as with Embodiment 3. When a plurality of sheets are copy-printed for the same image, as with Embodiment 1, it is not necessary for the film forming step and printing plate forming step to be re-executed. Hence, the image forming body 4 is fed to the developer 11 while holding the printing plate, where the ink image is formed again, and then to the transfer device 21, where the ink image is transferred to the recording medium 13 again.

After the copy printing of a desired number of sheets is completed, the untransferred ink is eliminated by the ink cleaner 22. Subsequently, when printing a new printing pattern, the process is executed from the step of re-forming the self-assembling monomolecular film 2 onto the surface of the gold film 1a. Namely, the n-hexane solution 3 containing the mixture of 2,2-difluoromethylfluoropentadecanethiol $2_3$ and fluorodecanethiol $2_1$ dissolved therein is applied to the surface of the gold film 1a by the film forming device 20, and the surface of the gold film 1a is dried by the fan 20c, whereby the surface of the gold film 1a can be re-modified with the self-assembling monomolecular film 2 as with the reaction shown in FIG. 24. Then, with the subsequent steps similar to those mentioned above, the new printing pattern can be printed. Though the self-assembling compound is desorbed by a halogen lamp (second desorbing device) in Embodiments 3 and 4 after the copy printing of a desired number of sheets is completed, the desorbing step by the second desorbing device may be omitted as shown in this embodiment since the self-assembling compound tends to be selectively adsorbed to the desorbed face and re-form the monomolecular film.

While preferred embodiments of the image forming apparatus in accordance with the present invention are explained in detail in the foregoing, the apparatus of the present invention should not be restricted to the above-mentioned embodiments.

For example, the above-mentioned embodiments employ, as the substrate 1 for forming the self-assembling monomolecular film, the drum 1b on which the gold film 1a is deposited. However, as noted, the substrate and self-assembling compound employed in the present invention should not be restricted to those mentioned above.

In the following, the present invention will be explained in more detail with reference to Examples, which are not limitative of the present invention.

EXAMPLE 1

As the substrate of the image forming body used for a printing plate, one in which a gold film (film thickness: 100 nm) had been deposited on an SUS plate (5 mm×5 mm) in vacuum was used. After the gold film surface of the above-mentioned substrate was heated at 350° C. for 60 minutes and then washed, the contact angle of distilled water with respect to its surface was measured (droplet amount: 7 μl) with a contact angle meter (type CA-A, manufactured by Kyowa Interface Science Co., Ltd.) and found to be 9°.

Also, decanethiol ($C_{10}H_{21}SH$) was used as a self-assembling compound. Namely, 80 mM of decanethiol were dissolved in 20 ml of n-hexane, whereby a 4-mM decanethiol/n-hexane solution was obtained.

When the gold film surface of the above-mentioned substrate was immersed in the above-mentioned decanethiol/n-hexane solution at room temperature, the above-mentioned decanethiol was substantially uniformly adsorbed to the gold film surface, whereby a self-assembling monomolecular film was formed. Then, the gold film surface formed with the above-mentioned self-assembling monomolecular film was dried with a warm current of air from a fan.

The contact angle of distilled water with respect to the gold film surface thus formed with the self-assembling monomolecular film was measured in a manner similar to that mentioned above and found to be 83°.

The foregoing results confirmed that the wettability of the surface had changed from hydrophilic to water-repellent as the above-mentioned decanethiol was adsorbed to the gold film surface so as to form the self-assembling monomolecular film.

EXAMPLE 2

As the substrate of the image forming body used for a printing plate, a plate barrel on which a gold film (film thickness: 100 nm) had been deposited was used. Also, as the self-assembling compound, 1,1,1,2,2,3,3,4,4,5,5,6,6,7,7,8,8-heptadecafluorodecanethiol ($C_8F_{17}CH_2CH_2SH$) was used.

After the gold film surface of the above-mentioned substrate was heated at 250° C. by a thermal head and then washed, an n-hexane solution of the above-mentioned thiol (concentration: 3 mM; temperature: 50° C.) was supplied to the gold film surface, whereby the above-mentioned thiol was substantially uniformly adsorbed to the gold film surface, and a self-assembling monomolecular film was formed. Then, the gold film surface formed with the above-mentioned self-assembling monomolecular film made of the above-mentioned thiol was dried with a warm current of air from a fan.

Subsequently, the gold film surface formed with the self-assembling monomolecular film was partly (at the part to be printed) heated to 250° C. with a thermal head so as to correspond to desired image data, whereby the above-mentioned self-assembling monomolecular film was desorbed from the heated part. As a consequence, a surface (undesorbed face) modified with the self-assembling monomolecular film and an unmodified surface (desorbed face) are formed on the above-mentioned gold film surface, thus allowing the printing plate in accordance with the present invention to be obtained.

Thereafter, oil ink for printing news paper was applied to the surface of the above-mentioned printing plate, whereby the ink was repelled by the surface (undesorbed face) modified with the above-mentioned self-assembling monomolecular film, whereas the surface (desorbed face) from which the above-mentioned self-assembling monomolecular film had been desorbed held the ink, thus enabling an ink image to be formed.

Then, a printing paper sheet (recording medium) was pressed against the surface of the printing plate formed with the above-mentioned ink image, and then the printing paper sheet was peeled off from the printing plate, whereby the ink image was transferred to the printing paper sheet, thus completing the printing.

EXAMPLE 3

As the self-assembling compound, 2,2-di-trifluoromethyl-1,1,1,3,3,4,4,5,5,6,6,7,7,8,8,9,9,10,10,11,11,12,12,13,13-pentaeicosafluoropentadecanethiol [$(CF_3)_3CC_{11}F_{22}C_2H_4SH$] and 1,1,1,2,2,3,3,4,4,5,5,6,6,7,7,8,8-heptadecafluorodecanethiol [$C_8F_{17}C_2H_4SH$] were used. These two kinds of thiols were mixed such that the molar ratio between fluoropentadecanethiol and fluorodecanethiol became 1:1, and thus obtained mixture was dissolved in n-hexane, so as to prepare an n-hexane solution whose total thiol concentration became 1 mM.

The n-hexane solution was supplied to and dried on the gold film surface in the same manner as that of Example 2 except for the use of the above-mentioned n-hexane solution, whereby a self-assembling monomolecular film, made of the above-mentioned two kinds of thiol, having a molecular-level minute uneven structure on the surface thereof was formed on the gold film surface.

Subsequently, the gold film surface formed with the above-mentioned self-assembling monomolecular film was partly heated as with Example 2, whereby the above-mentioned gold film surface was formed with a surface (undesorbed face) modified with the self-assembling monomolecular film and an unmodified surface (desorbed face) were formed, thus allowing a printing plate in accordance with the present invention to be obtained.

Thereafter, ink was supplied to the surface of the above-mentioned printing plate as with Example 2, whereby an ink image was formed as with Example 2, thus making it possible to transfer the above-mentioned ink image from printing plate to a printing paper sheet, so as to complete the printing.

Industrial Applicability

As explained in the foregoing, a so-called self-assembling monomolecular film was utilized as an image forming body in the image forming apparatus, image forming method, and platemaking method in accordance with the present invention. As a consequence, desorbing at least a part of the self-assembling compound constituting the self-assembling monomolecular film can easily form and erase a printing plate with respect to the image forming body.

Also, in the present invention, the same printing plate can be used repeatedly, whereby it becomes unnecessary to form a latent image per sheet, which has been required in the conventional electrophotographic printer, thus enabling high-speed printing.

Further, in the present invention, the same image forming body can repeatedly be used for a plurality of images. Therefore, it does not necessitate complicated devices and processes such as discarding a stencil and winding a new stencil, which have been required in the conventional mimeograph printer. Hence, higher-speed image formation is made possible with a small-size, simple apparatus, while realizing a lower running cost at the time of copy-printing a small number of sheets with the same original.

Also, since the image forming body in accordance with the present invention is formed by a self-assembling monomolecular film, individual bonds between molecules are controlled so as to form a plate. As a consequence, in accordance with the present invention, edge characteristics of the plate become favorable, and an image printing plate having a higher resolution can be formed, whereby higher-resolution printing would be possible.

Further, since the bonding strength between the substrate surface and the self-assembling monomolecular film is high, their bond would not be severed by the friction with respect to the recording medium or the like. Therefore, the printing plate would not change during the printing in the apparatus and method of the present invention, whereby high-quality printing is possible.

What is claimed is:

1. An image forming apparatus comprising:
an image forming body comprising a substrate and a self-assembling compound adsorbed to a surface of said substrate to form a self-assembling monomolecular film, said self-assembling compound having an adsorptive functional group adapted to be adsorbed to the surface of said substrate and an aliphatic compound residue, said self-assembling compound being able to spontaneously form a substantially uniform adsorption film of a monomolecular layer on the surface of said substrate, wherein the adsorptive functional group is selected from the group consisting of:
a thiol (—SH), a disulfide (—SS—), a sulfide (—S—), an amine (—NH$_2$), a diazo (—N$_2$), an azide (—N$_3$), a silicon (Si), and an aldehyde (—COH);
a first desorbing device for selectively desorbing at least a part of said self-assembling compound forming said self-assembling monomolecular film from the surface of said image forming body, so as to provide the surface of said image forming body with a desorbed face and an undesorbed face which have wettabilities different from each other;
a developing device for supplying the surface of said image forming body with ink which preferentially attaches to one of said desorbed face or undesorbed face; and
a transfer device for transferring to a recording medium the ink attached to the surface of said image forming body.

2. An image forming apparatus according to claim 1, wherein said self-assembling compound is at least one compound selected from the group consisting of a thiol compound expressed by the following general formula (1):

HSR$^1$ (1)

a disulfide compound expressed by the following general formula (2):

R$^2$SSR$^3$ (2)

and
a sulfide compound expressed by the following general formula (3):

R$^4$SR$^5$ (3)

3. An image forming apparatus according to claim 1, wherein said self-assembling compound is a mixture of at least two kinds of self-assembling compounds which can be adsorbed to the surface of said substrate so as to form a self-assembling monomolecular film having a minute uneven structure.

4. An image forming apparatus according to claim 3, wherein said at least two kinds of self-assembling compounds have adsorptive functional groups adapted to be adsorbed to the surface of said substrate and aliphatic compound residues combined to said adsorptive functional groups respectively, said aliphatic compound residues having main chain lengths different from each other and exhibiting wettabilities identical to each other, said self-assembling compounds being able to spontaneously form on the surface of said substrate an adsorption film of a monomolecular layer having a minute uneven structure.

5. An image forming apparatus according to claim 3, wherein said at least two kinds of self-assembling compounds have adsorptive functional groups adapted to be adsorbed to the surface of said substrate and aliphatic compound residues combined to said adsorptive functional groups respectively, said aliphatic compound residues having steric configurations different from each other and exhibiting wettabilities identical to each other, said self-assembling compounds being able to spontaneously form on the surface of said substrate an adsorption film of a monomolecular layer having a minute uneven structure.

6. An image forming apparatus according to claim 1, further comprising a first film forming device for supplying said self-assembling compound to the surface of said substrate so as to form the self-assembling monomolecular film on the surface of said substrate.

7. An image forming apparatus according to claim 1, wherein the film forming device is configured to supply said self-assembling compound to the surface of said image forming body so as to form the self-assembling monomolecular film on said desorbed face again.

8. An image forming apparatus according to claim 7, further comprising a second desorbing device for desorbing the self-assembling compound forming said undesorbed face from the surface of said image forming body so as to cause the whole surface of said image forming body to become the desorbed face.

9. An image forming apparatus according to claim 1, further comprising a moisture supply device which supplies, before said ink is supplied, moisture which preferentially attaches to one of said desorbed face or undesorbed face, to the surface of said image forming body.

10. An image forming apparatus according to claim 1, wherein said desorbing device is a heating device which applies thermal energy to the self-assembling compound forming said self-assembling monomolecular film, so as to desorb said compound.

11. An image forming method including:
a first desorbing step of selectively desorbing, from a surface of an image forming body comprising a substrate and a self-assembling compound adsorbed to a surface of said substrate to form a self-assembling film, at least a part of the self-assembling compound forming said self-assembling monomolecular film, so as to provide the surface of said image forming body with a desorbed face and an undesorbed face which have wettabilities different from each other, said self-assembling compound having an adsorptive functional group adapted to be adsorbed to the surface of said substrate and an aliphatic compound residue, said self-assembling compound being able to spontaneously form a substantially uniform adsorption film of a monomolecular layer on the surface of said substrate, wherein the adsorptive functional group is selected from the group consisting of:
a thiol (—SH), a disulfide (—SS—), a sulfide (—S—), an amine (—NH$_2$), a diazo (—N$_2$), an azide (—N$_3$), a silicon (Si), and an aldehyde (—COH);
a developing step of supplying the surface of said image forming body with ink which preferentially attaches to one of said desorbed face or undesorbed face; and
a transfer step of transferring a recording medium the ink attached to the surface of said image forming body.

12. An image forming method according to claim 11, wherein said self-assembling compound is at least one compound selected from the group consisting of a thiol compound expressed by the following general formula (1):

HSR$^1$ (1)

a disulfide compound expressed by the following general formula (2):

R$^2$SSR$^3$ (2)

a sulfide compound expressed by the following general and formula (3):

$$R^4SR^5 \qquad (3)$$

13. An image forming method according to claim 11, wherein said self-assembling compound is a mixture of at least two kinds of self-assembling compounds which can be adsorbed to the surface of said substrate so as to form a self-assembling monomolecular film having a minute uneven structure.

14. An image forming method according to claim 13, wherein said at least two kinds of self-assembling compounds have adsorptive functional groups adapted to be adsorbed to the surface of said substrate and aliphatic compound residues combined to said adsorptive functional groups respectively, said aliphatic compound residues having main chain lengths different from each other and exhibiting wettabilities identical to each other, said self-assembling compounds being able to spontaneously form on the surface of said substrate an adsorption film of a monomolecular layer having a minute uneven structure.

15. An image forming method according to claim 13, wherein said at least two kinds of self-assembling compounds have adsorptive functional groups adapted to be adsorbed to the surface of said substrate and aliphatic compound residues combined to said adsorptive functional groups respectively, said aliphatic compound residues having steric configurations different from each other and exhibiting wettabilities identical to each other, said self-assembling compounds being able to spontaneously form on the surface of said substrate an adsorption film of a monomolecular layer having a minute uneven structure.

16. An image forming method according to claim 11, further comprising a first film forming step of supplying said self-assembling compound to the surface of said substrate so as to form the self-assembling monomolecular film on the surface of said substrate.

17. An image forming method according to claim 11, further comprising a second film forming step of supplying said self-assembling compound to the surface of said image forming body so as to form the self-assembling monomolecular film on said desorbed face again.

18. An image forming method according to claim 17, further comprising a second desorbing step of desorbing the self-assembling compound forming said undesorbed face from the surface of said image forming body so as to cause the whole surface of said image forming body to become the desorbed face.

19. An image forming method according to claim 11, further comprising a moisture supply step of supplying, before said ink is supplied, moisture which preferentially attaches to one of said desorbed face or undesorbed face, to the surface of said image forming body.

20. An image forming method according to claim 11, wherein said desorbing step is a heating step which applies thermal energy to the self-assembling compound forming said self-assembling monomolecular film, so as to desorb said compound.

21. A platemaking method including:
a desorbing step of selectively desorbing, from a surface of an image forming body comprising a substrate and a self-assembling compound adsorbed to a surface of said substrate to form a self-assembling film, at least a part of the self-assembling compound forming said self-assembling monomolecular film so as to provide the surface of said image forming body with a desorbed face and an undesorbed face which have wettabilities different from each other, thereby yielding a printing plate, said self-assembling compound having an adsorptive functional group adapted to be adsorbed to the surface of said substrate and an aliphatic compound residue, said self-assembling compound being able to spontaneously form a substantially uniform adsorption film of a monomolecular layer on the surface of said substrate, wherein the adsorptive functional group is selected from the group consisting of:
a thiol (—SH), a disulfide (—SS—), a sulfide (—S—), an amine (—NH$_2$), a diazo (—N$_2$), an azide (—N$_3$), a silicon (Si), and an aldehyde (—COH).

22. A platemaking method according to claim 21, wherein said self-assembling compound is at least one compound selected from the group consisting of a thiol compound expressed by the following general formula (1):

$$HSR^1 \qquad (1)$$

a disulfide compound expressed by the following general formula (2):

$$R^2SSR^3 \qquad (2)$$

and
a sulfide compound expressed by the following general formula (3):

$$R^4SR^5 \qquad (3)$$

23. A platemaking method according to claim 21, wherein said self-assembling compound is a mixture of at least two kinds of self-assembling compounds which can be adsorbed to the surface of said substrate so as to form a self-assembling monomolecular film having a minute uneven structure.

24. A platemaking method according to claim 23, wherein said at least two kinds of self-assembling compounds have adsorptive functional groups adapted to be adsorbed to the surface of said substrate and aliphatic compound residues combined to said adsorptive functional groups respectively, said aliphatic compound residues having main chain lengths different from each other and exhibiting wettabilities identical to each other, said self-assembling compounds being able to spontaneously form on the surface of said substrate an adsorption film of a monomolecular layer having a minute uneven structure.

25. A platemaking method according to claim 23, wherein said at least two kinds of self-assembling compounds have adsorptive functional groups adapted to be adsorbed to the surface of said substrate and aliphatic compound residues combined to said adsorptive functional groups respectively, said aliphatic compound residues having steric configurations different from each other and exhibiting wettabilities identical to each other, said self-assembling compounds being able to spontaneously form on the surface of said substrate an adsorption film of a monomolecular layer having a minute uneven structure.

26. A platemaking method according to claim 21, further comprising a film forming step of supplying said self-assembling compound to the surface of said substrate so as to form the self-assembling monomolecular film on the surface of said substrate.

27. A platemaking method according to claim 21, wherein said desorbing step is a heating step which applies thermal energy to the self-assembling compound forming said self-assembling monomolecular film, so as to desorb said compound.

* * * * *